United States Patent
Chen et al.

(10) Patent No.: US 11,330,514 B2
(45) Date of Patent: May 10, 2022

(54) COMMUNICATIONS SYSTEM

(71) Applicant: NEC Corporation, Tokyo (JP)

(72) Inventors: Yuhua Chen, London (GB); Vivek Sharma, London (GB)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/908,311

(22) PCT Filed: Jul. 17, 2014

(86) PCT No.: PCT/JP2014/069632
§ 371 (c)(1),
(2) Date: Jan. 28, 2016

(87) PCT Pub. No.: WO2015/016138
PCT Pub. Date: Feb. 5, 2015

(65) Prior Publication Data
US 2016/0198398 A1    Jul. 7, 2016

(30) Foreign Application Priority Data

Aug. 2, 2013  (GB) .................................... 1313914

(51) Int. Cl.
*H04W 48/18* (2009.01)
*H04W 76/15* (2018.01)
*H04W 88/06* (2009.01)

(52) U.S. Cl.
CPC .......... *H04W 48/18* (2013.01); *H04W 76/15* (2018.02); *H04W 88/06* (2013.01)

(58) Field of Classification Search
CPC .... H04W 48/18; H04W 76/025; H04W 88/06
(Continued)

(56) References Cited

U.S. PATENT DOCUMENTS

2004/0203732 A1  10/2004 Brusilovsky
2005/0037758 A1* 2/2005 Rimoni ............. H04W 36/0061
                                                         455/436

(Continued)

FOREIGN PATENT DOCUMENTS

CA     2725406       10/2009
CN     102860087 A    1/2013

(Continued)

OTHER PUBLICATIONS

3rd Generation Partnership Project; Technical Specification Group Radio Access Network; Text proposal on WLAN/3GPP radio Interworking solution 3, Qualcomm Incorporated, Ericsson, Orange, CATT, Huawei, China Unicom, CMCC, ZTE, 3GPP TSG-RAN2#82, R2-132194, May 20-24, 2013 Fukuoka, Japan, pp. 1-5.

(Continued)

*Primary Examiner* — Christine Ng

(57) ABSTRACT

A communications system is described in which a communication device is able to communicate with a base station via a first communication path and with an access node via a second communication path. The communication device provides to the base station an indication of whether or not the communication device is enabled to use the second communication path. The communication device receives, from the base station and in dependence on the indication, control data for changing between the first and the second communication paths, and changes between the first and second communication paths in accordance with the received control data.

14 Claims, 7 Drawing Sheets

(58) Field of Classification Search
USPC .............................. 370/328, 338, 401, 465
See application file for complete search history.

(56) References Cited

U.S. PATENT DOCUMENTS

| | | | |
|---|---|---|---|
| 2005/0096051 A1* | 5/2005 | Lee | H04W 36/0055 455/438 |
| 2005/0180444 A1* | 8/2005 | Gu | H04L 47/10 370/412 |
| 2006/0067213 A1* | 3/2006 | Evans | H04L 45/121 370/229 |
| 2006/0276189 A1* | 12/2006 | Kiernan | H04W 36/14 455/436 |
| 2008/0107051 A1 | 5/2008 | Chen | |
| 2008/0117811 A1* | 5/2008 | Seo | H04L 47/30 370/230 |
| 2008/0305825 A1* | 12/2008 | Shaheen | H04W 8/24 455/552.1 |
| 2009/0080382 A1* | 3/2009 | Chen | H04W 36/0016 370/331 |
| 2009/0098872 A1* | 4/2009 | Deshpande | H04J 11/0093 455/435.2 |
| 2009/0141683 A1* | 6/2009 | Grinshpun | H04W 60/06 370/331 |
| 2010/0323662 A1* | 12/2010 | Dahlen | H04W 48/02 455/410 |
| 2012/0196644 A1* | 8/2012 | Scherzer | H04W 48/18 455/524 |
| 2012/0269127 A1 | 10/2012 | Sugahara | |
| 2012/0275394 A1* | 11/2012 | Gunnarsson | H04W 72/082 370/329 |
| 2012/0276936 A1* | 11/2012 | Ahn | H04W 76/19 455/501 |
| 2013/0028172 A1 | 1/2013 | Lim et al. | |
| 2013/0035101 A1* | 2/2013 | Wang | H04W 36/08 455/437 |
| 2013/0044708 A1* | 2/2013 | Kim | H04W 4/06 370/329 |
| 2014/0079022 A1* | 3/2014 | Wang | H04W 36/22 370/331 |
| 2014/0133298 A1* | 5/2014 | Han | H04W 28/0289 370/230 |
| 2014/0357224 A1* | 12/2014 | Walley | H04W 36/26 455/407 |
| 2016/0007276 A1* | 1/2016 | Forssell | H04W 8/20 455/422.1 |
| 2016/0135100 A1* | 5/2016 | Teyeb | H04W 36/0088 370/331 |

FOREIGN PATENT DOCUMENTS

| | | |
|---|---|---|
| JP | 2003-528507 A | 9/2003 |
| JP | 2008-500751 A | 1/2008 |
| JP | 2017-156353 A | 9/2017 |
| JP | 2020-530690 A | 10/2020 |
| WO | 2007/127717 A2 | 11/2007 |
| WO | 2008/154236 A1 | 12/2008 |
| WO | 2009/135991 | 11/2009 |
| WO | 2010/033919 A3 | 3/2010 |
| WO | 2011/129107 A1 | 10/2011 |

OTHER PUBLICATIONS

3rd Generation Partnership Project; Technical Specification Group Radio Access Network; Air-Interface Enhancement Proposals for WLAN/3GPP Radio Interworking, Broadcom Corporation, 3GPP TSG-RAN WG2 Meeting #81-BIS, R2-131384, Apr. 15-Apr. 19, 2013, Chicago, United States, pp. 1-8.
Japanese Office Action for JP Application No. 2016-503249 dated Nov. 22, 2016.
Universal Mobile Telecommunications System; LTE; "Architechture enhancements for non-3GPP accesses", 3GPP TS 23.402 version 11.7.0 Release 11, Jun. 2013 Cited in the Specification.
3rd Generation Partnership Project; Technical Specification Group Radio Access Network; "Evolved Universal Terrestrial Radio Access Network"; S1 Application Protocol, 3GPP TS 36.413 V11.4.0, Jun. 2013 Cited in the Specification.
3rd Generation Partnership Project; Technical Specification Group Radio Access Network; "Evolved Universal Terrestrial Radio Access Network"; Radio Resource Control, Protocol Specificaiton, 3GPP TS 36.331 V11.4.0, Jun. 2013 Cited in the Specification.
LG Electronics Inc., "Comparison of access network selection solutions", 3GPP Draft; R2-132055, Comparison of Access Network Selection Solutions. 3rd Generation Partnership Project (3GPP), Fukuoka, Japan, May 11, 2013, XP050700143. Cited in ISR.
Huawei, "[81 bis#12][Joint!WiFi] Relation of RAN mechanisms to ANDSF", 3GPP Draft; R2-132111, 81BIS #12—Joint-WiFi-Relation of RAN Mechanisms to ANDFS, 3rd Generation Partnership Project (3GPP), Fukuoka, Japan, May 20, 2013, XP050700198 Cited in ISR.
International Search Report for PCT Application No. PCT/JP2014/069632, dated Nov. 19, 2014.
Chinese Office Action for CN Application No. 201480043858.4 dated Jun. 4, 2018 with English Translation.
Communication dated Oct. 3, 2018 from the Japanese Patent Office in counterpart application No. 2017-156353.
3rd Generation Partnership Project; Technical Specification Group Radio Access Network; Study on WLAN/3GPP Radio Interworking (Release 12) WG2#82 R2-132249, 3GPP TR 37.834 V0.3.0 (May 2013), pp. 1-14 (15 pages).
New Postcom, "Consideration on WLAN scanning and power consumption", 3GPP TSG RAN WG2 Meeting #82, Fukuoka, Japan, R2-131715, May 20, 2013, pp. 1-4 (4 pages total).
Communication dated Jul. 3, 2019, from the Japanese Patent Office in counterpart application No. 2017-156353.
Indian Office Action for IN Application No. 201617004449 dated Sep. 30, 2019.
Japanese Office Action for JP Application No. 2019-181867 dated Oct. 6, 2020 with English Translation.
Japanese Office Action for JP Application No. 2019-181867 dated Dec. 8, 2020 with English Translation.
Japanese Office Action for JP Application No. 2019-181867 dated Mar. 23, 2021 with English Translation.
Indian Office Communication for IN Application No. 201617004449 dated Mar. 8, 2022.

* cited by examiner

COMMUNICATIONS SYSTEM

This application is a National Stage Entry of PCT/JP2014/069632 filed on, Jul. 17, 2014, which claims priority from United Kingdom patent Application 1313914.2 filed on Aug. 2, 2013, the contents of all of which are incorporated herein by reference, in their entirety.

TECHNICAL FIELD

The present invention relates to a communications system. The invention has particular but not exclusive relevance to wireless communications systems and devices thereof operating according to the 3rd Generation Partnership Project (3GPP) standards or equivalents or derivatives thereof. The invention has particular although not exclusive relevance to the controlling of interworking between different access technologies.

BACKGROUND ART

Under the 3GPP standards, a NodeB (or an eNB in LTE) is the base station via which mobile devices connect to a core network and communicate to other mobile devices or remote servers. For simplicity, the present application will use the term base station to refer to any such base stations. Communications devices might be, for example, mobile communications devices such as mobile telephones, smartphones, user equipment, personal digital assistants, laptop computers, web browsers, and the like. 3GPP standards also make it possible to connect non-mobile user equipment to the network, such as Wi-Fi routers, modems, which can be implemented as a part of a (generally) stationary apparatus. For simplicity, the present application refers to mobile communications devices (or mobile devices) in the description but it will be appreciated that the technology described can be implemented on any mobile and "non-mobile" equipment that can connect to such a core network.

The latest developments of the 3GPP standards are referred to as the Long Term Evolution (LTE) of EPC (Evolved Packet Core) network and E-UTRA (Evolved UMTS Terrestrial Radio Access) network. LTE (and more recently LTE 'Advanced') makes it possible for User Equipment (UE), such as mobile devices to connect efficiently to the core network using alternative, non-3GPP radio access technologies (RAT) as well, for example, using the Wireless Local Area Network (WLAN) standard and the like. The supported access technologies are covered in the 3GPP TS 23.402 (V11.7.0) standards document.

When the mobile device accesses the core network via a WLAN, a suitable communication bearer will be set up to allow communication. The communication bearer generally comprises a user plane connection for user communications and a control plane connection for managing the mobile communication device's communications. For example, a WLAN communication bearer may be set up for communication between the mobile communication device and the access point, possibly with the assistance of a core network entity, such as an Access Network Discovery and Selection Function (ANDSF) or similar. Regardless of the way the WLAN communication bearer is set up and its associated transmission characteristics, the WLAN communication bearer may be used by the mobile device for user plane communications via an access point of the WLAN instead of (or in addition to) user plane communications via a base station.

Current 3GPP standards and related documentation specify various mechanisms for steering the mobile device's communications between a WLAN and the E-UTRAN under the control of the E-UTRAN/EPC. In particular, it has been suggested that the radio access network can provide 'assistance' information to the mobile device (either via broadcast or dedicated signalling) in order to indicate to the mobile device under what circumstances a WLAN, and which WLAN, should be used for the mobile device's communications. The mobile device may also obtain information and policies (either directly from a WLAN or via a core network entity, e.g. the ANDSF) to specify whether or not the mobile device is allowed to use a particular WLAN or may be pre-configured with such information and/or policies. Further, the mobile device may also carry out signal quality (signal strength) measurements, e.g. if requested to by the E-UTRAN, before steering its communications to/from a particular WLAN. Thus, when the mobile device is requested to communicate via an access point of a WLAN, corresponding communication resources in the E-UTRAN part of the network can be re-allocated to other communications without sacrificing the service quality and/or service continuity for the end user.

The traffic steering mechanism currently favoured by 3GPP comprises the mobile device's serving base station configuring signal measurements to be carried out by the mobile device with respect to candidate WLAN(s) and instructing the mobile device to steer its communications to/from a WLAN in dependence upon the results of such measurements. In this mechanism, therefore, the base station instructs the mobile device to establish communication via a particular WLAN and to continue communicating via an access point of that WLAN only after the base station has determined, based on measurement results reported by the mobile device, that the signal strength of the WLAN is sufficient for offloading (at least some of) the mobile device's communications from the E-UTRAN.

SUMMARY OF INVENTION

Technical Problem

However, such traffic steering mechanisms can result in inefficient use of communication and other resources both at the base station, the mobile communication device and, to a certain extent the WLAN access point to which the base station is attempting to steer traffic. This is a particular issue when, for example: the user of the mobile device has switched off the mobile device's WLAN functionality; the user decides not to join a certain WLAN access point when given the opportunity to do so (effectively overruling any traffic steering request from the E-UTRAN); the mobile device is unable to join the destination WLAN for technical reasons (e.g. due to technical incompatibilities, congestion in the destination WLAN and/or preferences of the WLAN operator); and/or the like. In such scenarios, a significant part of the steering process may be completed unnecessarily thereby consuming valuable radio resources without achieving offloading the mobile device's communications to the WLAN. Further, inefficiencies may also result because the eNB selects an inappropriate WLAN to steer to thereby causing a swift return to the E-UTRAN.

There is, therefore, a conflict between end user flexibility, independence and control allowing them to refuse to use a particular WLAN on the one hand, and a network operator's potential preference for tighter, network controlled interworking between E-UTRAN and WLANs in which the mobile device automatically accepts redirection to a WLAN without the possibility of user veto.

Solution of Problem

Accordingly, preferred embodiments of the present invention aim to provide methods and apparatus which overcome or at least partially alleviate the above issues.

Although for efficiency of understanding for those of skill in the art, the invention will be described in detail in the context of a 3GPP system (UMTS, LTE), the principles of the invention can be applied to other systems in which mobile devices or User Equipment (UE) access a core network using multiple access technologies.

In one aspect, the invention provides a communication device for use in a cellular communication network comprising a base station and for use in a local area network comprising an access point, the communication device comprising: means for communicating: i) with said base station via a first communication path; and ii) with said access node via a second communication path. The communication device comprises means for providing, to said base station, an indication of whether or not the communication device is enabled to use said second communication path; means for receiving, from said base station and in dependence on said indication of whether or not the communication device is enabled to use said second communication path, control data for changing between said first and said second communication paths; and means for changing between said first and said second communication paths in accordance with said control data.

The communicating means might be operable to communicate via said first communication path using a first radio access technology and to communicate via said second communication path using a second radio access technology.

The communication device might be enabled (or not enabled) to use said second communication path by means of a user preference indicating that a user is willing (or unwilling) to allow use of said second communication path and said indication of whether or not the communication device is enabled might comprise an indication of said user preference.

The indication of whether or not the communication device is enabled to use said second communication path might comprise an indication of a user preference indicating that use of said second radio access technology has been (or has not been) allowed.

The indication of whether or not the communication device is enabled to use said second communication path might comprise an indication of a user preference indicating use of a particular local area network is preferred (or is not preferred) over use of said cellular communication network.

The communication device might further comprise means for maintaining a list of local area networks that said communication device is capable of and/or permitted to use (e.g. a list of operator controlled local area networks, a list of trusted local area networks, a list of preferred local area networks, a list of whitelisted local area networks) and said indication of whether or not the communication device is enabled to use said second communication path might comprise an indication of whether or not said particular local area network is included in said list.

The communication device might further comprise means for maintaining a list of local area networks that said communication device is not capable of and/or not permitted to use (e.g. a list of banned local area networks, a list of blacklisted local area networks, a list of unauthorised local area networks, a list of local area networks incompatible) and said indication of whether or not the communication device is enabled to use said second communication path might comprise an indication of whether or not said particular local area network is included in said list.

The indication of whether or not the communication device is enabled to use said second communication path might comprise an indication of a capability of said communication device for communicating using said second communication path.

The indication of whether or not the communication device is enabled to use said second communication path might comprise information identifying at least one of: bands/frequencies supported by said communication device; a capability of said communication device for communicating simultaneously via said first and said second communication paths; a capability of said communication device for Internet Protocol Flow Mobility (IFOM); and a capability of said communication device for Multi Access Packed Data Network Connectivity (MAPCON).

The providing means might be operable to provide said indication of whether or not the communication device is enabled to use said second communication path by sending at least one signalling message to said base station via said first communication path. In this case, the providing means might be operable to provide said indication of whether or not the communication device is enabled to use said second communication path using at least one information element (IE) included in said at least one signalling message sent to said base station via said first communication path.

The providing means might be operable to provide said indication of whether or not the communication device is enabled to use said second communication path by omitting to send at least one expected signalling message to said base station via said first communication path.

The means for providing said indication of whether or not the communication device is enabled to use said second communication path might be operable to provide said indication prior to a steering procedure being initiated for said communication device.

The means for providing said indication of whether or not the communication device is enabled to use said second communication path might be operable to provide said indication as part of a procedure for attaching the communication device to said communication system (e.g. an attach procedure forming part of a Non-Access Stratum Procedure).

The means for providing said indication of whether or not the communication device is enabled to use said second communication path might be operable to provide said indication as part of a radio connection establishment procedure between said communication device and said base station.

The means for providing said indication of whether or not the communication device is enabled to use said second communication path might be operable to provide said indication by sending at least one signalling message during an establishment of said first communication path.

The at least one signalling message sent during said establishment of said first communication path might comprise at least one Radio Resource Control (RRC) signalling message, e.g. a 'RRC Connection Establishment' message.

The means for providing said indication of whether or not the communication device is enabled to use said second communication path might be operable to provide said indication in response to signalling associated with initiation of a steering procedure for said communication device. In this case, the signalling associated with initiation of a steering procedure might comprise configuration information for configuring signal measurements for signals from said access point. The at least one signalling message might comprise at least one 'RRC Connection Reconfiguration Complete' message.

The providing means might be operable to provide said indication of whether or not the communication device is enabled to use said second communication path by sending at least one signalling message in response to said communication device receiving said configuration information for configuring signal measurements. In this case, the providing means might be operable to provide said indication of whether or not the communication device is enabled to use said second communication path by sending at least one measurement report comprising results of measurements made responsive to said configuration information for configuring signal measurements.

The providing means might be operable to provide said indication of whether or not the communication device is enabled to use said second communication path by omitting to provide at least one measurement report comprising results of measurements made responsive to said configuration information for configuring signal measurements.

The means for providing said indication of whether or not the communication device is enabled to use said second communication path might be operable to provide said indication as part of a steering procedure comprising said request by said base station to change from said first communication path to said second communication path for said communication device (e.g. to be used by said base station in a subsequent steering procedure).

The providing means might be operable to provide said indication of whether or not the communication device is enabled to use said second communication path by sending a negative acknowledgement (Nack) in response to said request by said base station to change from said first communication path to said second communication path.

The communication device might comprise user equipment operating in accordance with the Long Term Evolution (LTE) standards.

In one aspect, the invention provides a base station for controlling a communication device operable to communicate via at least one of said base station and an access point of a local area network, the base station comprising: means for communicating with the communication device using a first communication path; means for obtaining, from said communication device, an indication of whether or not the communication device is enabled to use a second communication path via said access point; and means for providing, to said communication device and in dependence on said indication of whether or not the communication device is enabled to use said second communication path, control data for changing between said first communication path and said second communication path.

The base station might further comprise means for maintaining a list of local area networks that said communication device is capable of and/or permitted to use (e.g. a list of operator controlled local area networks, a list of trusted local area networks, a list of preferred local area networks, a list of whitelisted local area networks) and said maintaining means might be operable to include in said list said particular local area networks when said indication indicates that the communication device is enabled to use said second communication path.

The base station might further comprise means for maintaining a list of local area networks that said communication device is not capable of and/or not permitted to use (e.g. a list of banned local area networks, a list of blacklisted local area networks, a list of unauthorised local area networks, a list of local area networks incompatible) and said maintaining means might be operable to include in said list said particular local area networks when said indication indicates that the communication device is not enabled to use said second communication path.

The obtaining means might be operable to obtain said indication of whether or not the communication device is enabled to use said second communication path by receiving at least one signalling message from said communication device via said first communication path. In this case, the obtaining means might be operable to obtain said indication of whether or not the communication device is enabled to use said second communication path using at least one information element (IE) included in said at least one signalling message received from said communication device via said first communication path.

The obtaining means might be operable to obtain said indication of whether or not the communication device is enabled to use said second communication path by determining that at least one expected signalling message from said communication device has not been received.

The means for obtaining said indication of whether or not the communication device is enabled to use said second communication path might be operable to obtain said indication prior to the base station initiating a steering procedure for said communication device.

The means for obtaining said indication of whether or not the communication device is enabled to use said second communication path might be operable to obtain said indication as part of a procedure for attaching the communication device to said communication system (e.g. an attach procedure forming part of a Non-Access Stratum Procedure).

The means for obtaining said indication of whether or not the communication device is enabled to use said second communication path might be operable to obtain said indication as part of a radio connection establishment procedure between said communication device and said base station.

The means for obtaining said indication of whether or not the communication device is enabled to use said second communication path might be operable to obtain said indication by receiving at least one signalling message during an establishment of said first communication path.

The means for obtaining said indication of whether or not the communication device is enabled to use said second communication path might be operable to obtain said indication in response to signalling associated with initiation of a steering procedure for said communication device. In this case, the signalling associated with initiation of a steering procedure might comprise configuration information for configuring signal measurements for signals from said access point. The at least one signalling message might comprise at least one 'RRC Connection Reconfiguration Complete' message.

The obtaining means might be operable to obtain said indication of whether or not the communication device is enabled to use said second communication path by receiving at least one signalling message in response to said base station sending said configuration information for configuring signal measurements. In this case, the obtaining means might be operable to obtain said indication of whether or not the communication device is enabled to use said second communication path by receiving at least one measurement report comprising results of measurements made responsive to said configuration information for configuring signal measurements.

The obtaining means might be operable to obtain said indication of whether or not the communication device is enabled to use said second communication path by determining that at least one measurement report comprising results of measurements made responsive to said configuration information for configuring signal measurements has been omitted by said communication device.

The means for obtaining said indication of whether or not the communication device is enabled to use said second communication path might be operable to obtain said indication as part of a steering procedure comprising said request by said base station to change from said first communication path to said second communication path for said communication device (e.g. to be used by said base station in a subsequent steering procedure). In this case, the obtaining means might be operable to obtain said indication of whether or not the communication device is enabled to use said second communication path by receiving a negative acknowledgement (Nack) in response to said request by said base station to change from said first communication path to said second communication path.

The base station might comprise means for configuring signal measurements for signals from said access point in dependence of said obtained indication of whether or not the communication device is enabled to use said second communication path.

The base station might comprise means for requesting said communication device to change from said first communication path to said second communication path in dependence of said obtained indication of whether or not the communication device is enabled to use said second communication path.

The base station might comprise a base station operating in accordance with the Long Term Evolution (LTE) standards.

In one aspect, the invention also provides a system comprising the above described communication device and the above described base station.

In one aspect, the invention provides a communication device for use in a cellular communication network comprising a base station and for use in a local area network comprising an access point, the communication device comprising a processor and a transceiver, wherein the transceiver is configured to: communicate with said base station via a first communication path; and to communicate with said access node via a second communication path; provide, to said base station, an indication of whether or not the communication device is enabled to use said second communication path; and receive, from said base station and in dependence on said indication of whether or not the communication device is enabled to use said second communication path, control data for changing between said first and said second communication paths. The processor is configured to change between said first and said second communication paths in accordance with said control data.

In one aspect, the invention provides a method performed by a communication device operable to communicate with a base station of a cellular communication network via a first communication path and to communicate with an access point of a local area network via a second communication path, the method comprising: providing, to said base station, an indication of whether or not the communication device is enabled to use said second communication path; receiving, from said base station and in dependence on said indication of whether or not the communication device is enabled to use said second communication path, control data for changing between said first and said second communication paths; and changing to said second communication path or maintaining said first communication path in dependence on said receiving, from said base station in dependence on said indication of whether or not the communication device is enabled to use said second communication path, control data for changing between said first and said second communication paths.

The step of receiving, from said base station and in dependence on said indication of whether or not the communication device is enabled to use said second communication path, control data for changing between said first and said second communication paths might comprise: receiving said control data for changing between said first and said second communication paths when said indication of whether or not the communication device is enabled to use said second communication path indicates that said device is enabled to use said second communication path; and not receiving said control data for changing between said first and said second communication paths when said indication of whether or not the communication device is enabled to use said second communication path indicates that said device is not enabled to use said second communication path.

In one aspect, the invention provides a method performed by a base station of a cellular communication network for controlling a communication device wherein the communication device is operable to communicate with said base station via a first communication path, and operable to communicate with an access point of a local area network via a second communication path, the method comprising: obtaining, from said communication device, an indication of whether or not the communication device is enabled to use said second communication path via said access point; and providing, in dependence on said indication of whether or not the communication device is enabled to use said second communication path, control data for changing between said first communication path and said second communication path.

The step of providing, in dependence on said indication of whether or not the communication device is enabled to use said second communication path, control data for changing between said first communication path and said second communication path might comprise: providing said control data for changing between said first and said second communication paths when said indication of whether or not the communication device is enabled to use said second communication path indicates that said device is enabled to use said second communication path; and not providing said control data for changing between said first and said second communication paths when said indication of whether or not the communication device is enabled to use said second communication path indicates that said device is not enabled to use said second communication path.

The invention also provides, for all methods disclosed, corresponding computer programs or computer program products for execution on corresponding user equipment or network communications devices.

BRIEF DESCRIPTION OF DRAWINGS

Embodiments of the invention will now be described, by way of example, with reference to the accompanying drawings in which.

DESCRIPTION OF EMBODIMENTS

Overview

Figure 1:
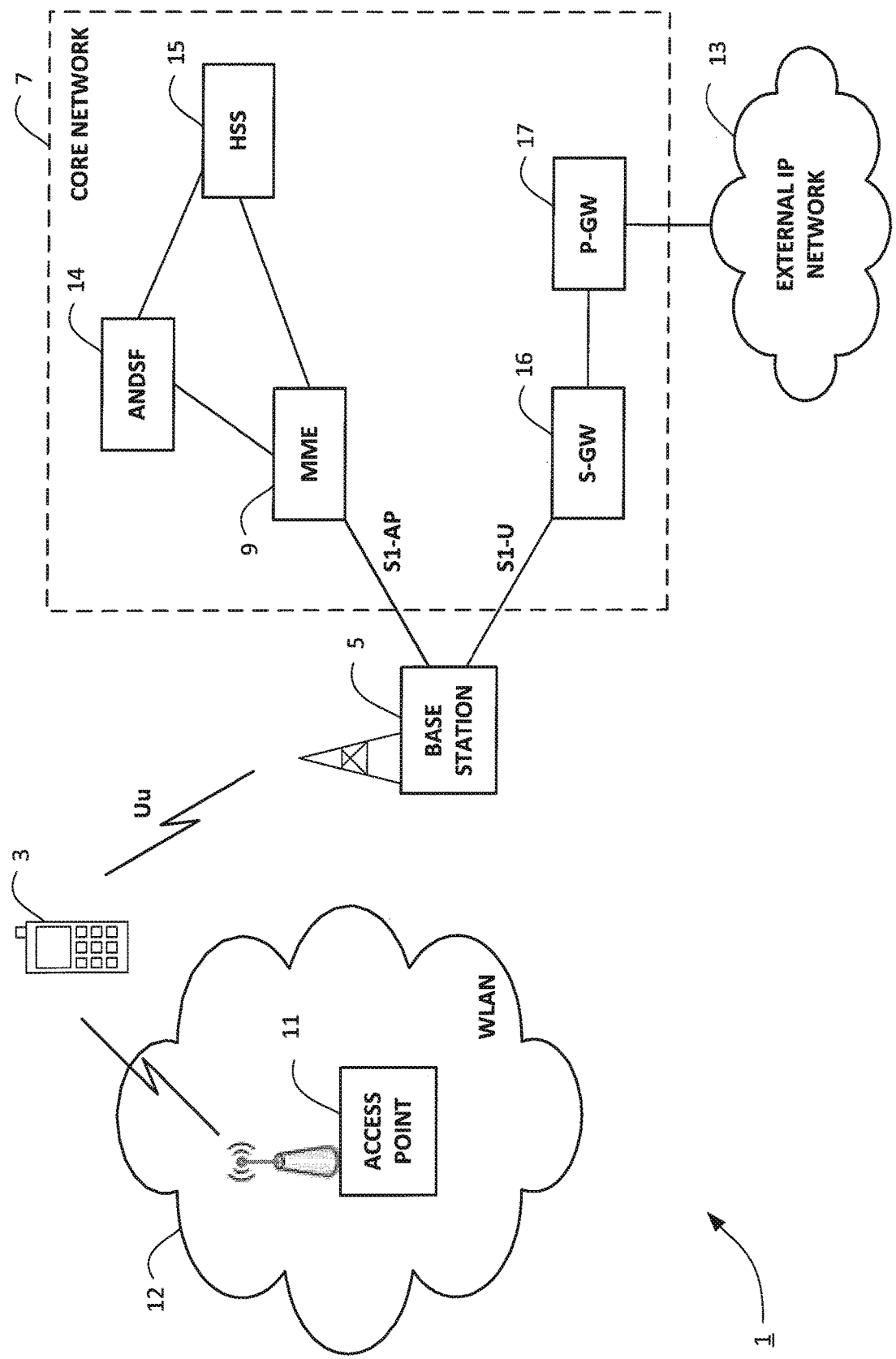
FIG. 1 illustrates schematically a cellular telecommunications system to which embodiments of the invention may be applied.

FIG. 1 schematically illustrates a telecommunications network 1 in which users of mobile devices 3 can communicate with each other and other users via E-UTRAN base stations 5 and a core network 7 using an E-UTRA radio access technology (RAT). As those skilled in the art will appreciate, whilst one mobile device 3 and one base station 5 are shown in FIG. 1 for illustration purposes, the system, when implemented, will typically include other base stations and mobile devices.

As is well known, a mobile device 3 may enter and leave the areas (i.e. radio cells) served by the base stations 5 as the mobile device 3 is moving around in the geographical area covered by the telecommunications system 1. In order to keep track of the mobile device 3 and to facilitate movement between the different base stations 5, the core network 7 comprises a mobility management entity (MME) 9 which is in communication with the base station 5 coupled to the core network 7. The core network also comprises an ANDSF 14, an HSS 15, a serving gateway (S-GW) 16, and a packet data network gateway (P-GW) 17.

The base station 5 is connected to the MME 9 via an "S1-AP" interface, also known as "S1-MME" interface, which is defined in the 3GPP Technical Standard (TS) 36.413 (V11.4.0). The MME 9, the ANDSF 14, and the HSS 15 are also connected to each other via respective interfaces. For each mobile device 3, the HSS 15 stores the subscription data (such as settings and subscription data required for the 3GPP subscriber to access the WLAN interworking service) and the authorisations for accessing the core network 7 and the WLAN 12.

The mobile device 3 and the base station 5 are connected via an air interface, the so-called "Uu" interface, and the base station 5 and the S-GW 16 are connected via an "S1-U" interface. From the core network 7, connection to an external IP network 13, such as the Internet, is provided via the P-GW 17 linked to the SGW 16. It will be appreciated that, whilst shown as separate entities, the functionalities of the S-GW 16 and the P-GW 17 could be implemented in a single gateway element.

In this embodiment the mobile device 3 can be connected to the WLAN 12, via an access point (AP) 11 when in the coverage area of the access point 11. When connected to the WLAN 12, the mobile device 3 and the access point 11 are connected via a WLAN air interface. In this example, the access point 11 might be directly coupled to the core network 7, but it might also be coupled via an external IP network 13 (e.g. the internet). However, in other examples, the access point is not coupled to and thus operates independently from the core network 7.

The ANDSF 14 remotely assists the mobile device 3 in setting up a connection to the WLAN 12. This is achieved by the ANDSF 14 providing the mobile device 3 (e.g. via the base station 5) information to assist the mobile device 3 to discover non-3GPP networks (such as WLAN 12) and associated rules policing the mobile device's 3 connection to such networks. Once connected to the WLAN 12 (which itself may or may not be connected to the core network 7), the mobile device 3 can continue accessing the core network 7 through the base station 5.

A WLAN 12 usually has an access point 11 that performs management of the WLAN, such as authorisation and authentication of the connected or participating devices, allocation and sharing of wireless resources, and other services like packet broadcast or power saving control. Depending on the WLAN technology used, the features of the access point 11 can be centralised on dedicated infrastructure equipment such as presented in FIG. 1, or distributed on a number of devices, e.g. on the devices participating in the WLAN. Depending on the WLAN technology, this management function can have different names: for example, it can be named access point in 802.11 technologies, Master in Bluetooth technologies, and possibly named differently in other WLAN technologies.

Initially, the mobile device 3 is served by the base station 5 and has established a communication bearer to the core network 7 via that base station 5. However, in order to optimise network load or similar reasons, the base station 5 is capable of steering (at least some of) the user plane traffic of mobile devices that it serves to/from a WLAN. In order to support such steering, the base station 5 is able to configure the mobile devices to perform measurements of the WLAN signals, and to provide associated measurement report(s), to allow the base station 5 to select an appropriate WLAN for attempting to offload a mobile device's user plane communications to.

Beneficially, however, in this example the mobile device 3 and the base station 5 are mutually configured such that the mobile device's 3 capabilities and/or any associated user preference(s) can be taken into account when determining whether or not a steering procedure should be initiated and/or further progressed for that specific mobile device's 3 user plane communications.

More specifically, in this example, the mobile device 3 is beneficially able to provide an indication to the base station 5 of the ability/configuration of the mobile device 3 to perform steering related functions (e.g. as a result of a user preference and/or as a result of technical considerations), before the steering process is initiated and/or before the steering process has progressed significantly. To support this function, the mobile device 3 is beneficially able to maintain capability information identifying whether or not WLAN communication is supported and/or user preference information identifying a user's preference(s) for using E-UTRAN or WLAN (or both).

Therefore, by taking into account the indication provided by the mobile device 3, the base station 5 is beneficially able to determine whether steering of user plane communications for the mobile device 3 to the WLAN 12 should be initiated and/or progressed.

Advantageously, therefore, this approach ensures that the steering of communication to/from a target WLAN 12 can be carried out under the control of the network operator taking account of the ability/configuration of the device of the mobile device to perform steering related functions in relation to a particular WLAN. The approach also avoids the mobile device 3 attempting to carry out communications via a WLAN that is not currently supported by the mobile device 3 or preferred by the user of it. Therefore, the provision of information by the mobile device 3 to the base station 5 for assisting the steering procedure is beneficial for both the user of the mobile device 3 (e.g. due to improved service experience) and the network operator (e.g. efficient use of the available communication resources).

The proposed system has particular benefits over systems in which a steering procedure progresses, regardless of user preference/device capability, unless there is an error (e.g. because wireless access is de-activated or due to signalling issues). In such systems, the mobile device responds to any steering associated control signalling that it can comply with, with an appropriate response indicating successful progress of the steering procedure. The proposed system avoids having to wait for a significant part of the steering process to be completed (e.g. steering associated measurement configuration and reporting signalling) before a steering command/request has been received that can be rejected by a user and/or the device.

Accordingly, this avoids the unnecessary consumption of valuable radio resources when offloading the mobile device's user plane communications to a WLAN is not preferred by a user and/or is not possible.

Further, in the proposed system, rather than to simply relying on the reported signal quality of a target WLAN, the base station 5 is able to consider user preferences/device capabilities, and possibly also consider the target WLAN's support for a quality of service required by the mobile device's communications, which may also be reported by the mobile device. Such additional information may thus further improve the efficiency in the interworking between the radio access networks (E-UTRAN and WLAN) supported by the mobile device.

Mobile Device

Figure 2:
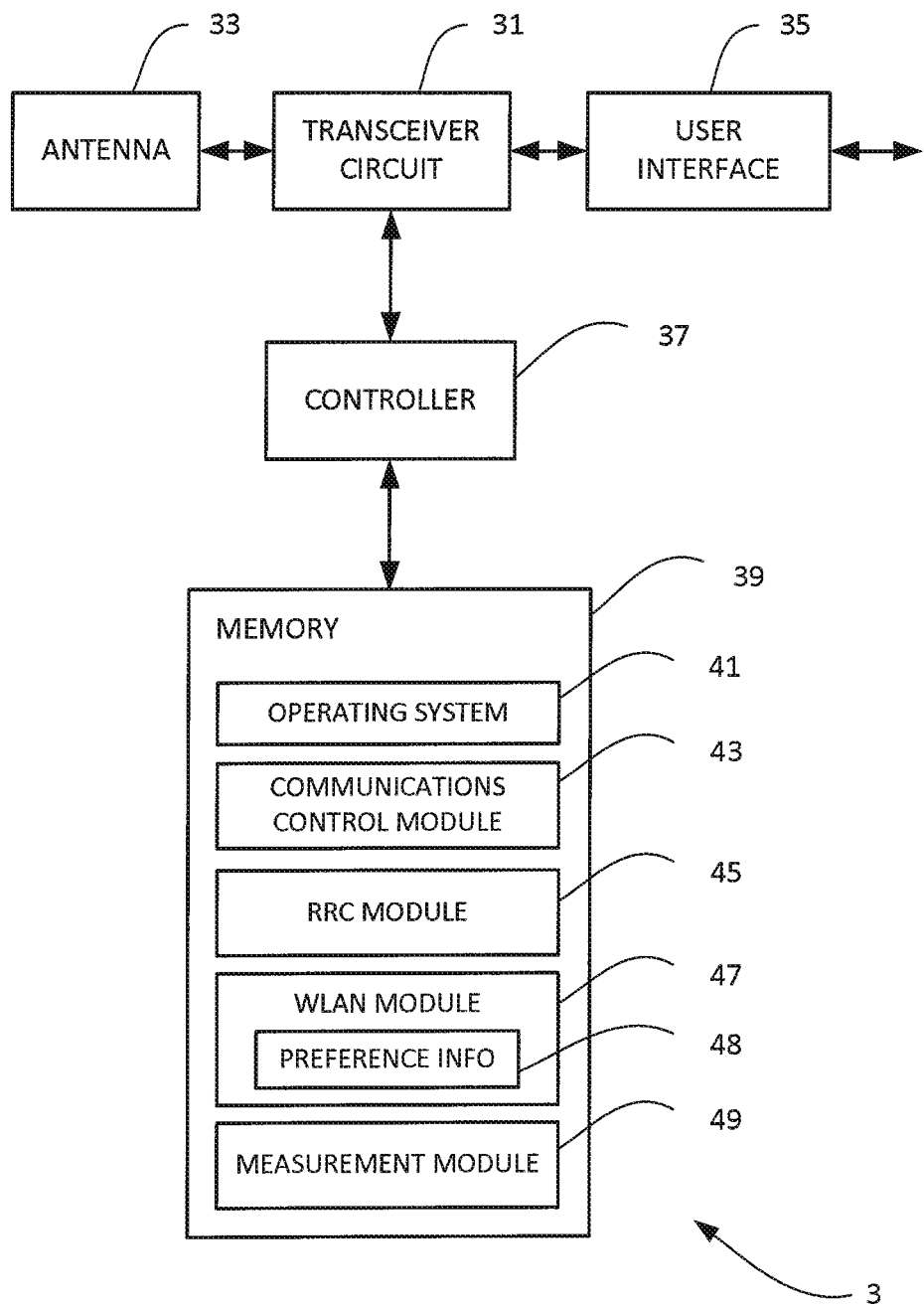
FIG. 2 is a block diagram of a mobile device forming part of the system shown in FIG. 1.

FIG. 2 is a block diagram illustrating the main components of the mobile device 3 shown in FIG. 1. As shown, the mobile device 3 has a transceiver circuit 31 that is operable to transmit signals to and to receive signals from a base station 5 and to transmit signals to and to receive signals from an access point 11 via one or more antenna 33. The mobile device 3 has a controller 37 to control the operation of the mobile device 3. The controller 37 is associated with a memory 39 and is coupled to the transceiver circuit 31. Although not necessarily shown in FIG. 2, the mobile device 3 will of course have all the usual functionality of a conventional mobile device 3 (such as a user interface 35) and this may be provided by any one or any combination of hardware, software and firmware, as appropriate. Software may be pre-installed in the memory 39 and/or may be downloaded via the telecommunications network or from a removable data storage device (RMD), for example.

The controller 37 controls overall operation of the mobile device 3 by, in this example, program instructions or software instructions stored within memory 39. As shown, these software instructions include, among other things, an operating system 41, a communications control module 43, an RRC module 45, a WLAN module 47, and a measurement module 49.

The communications control module 43 controls the communication between the mobile device 3 and the base station 5 or the access point 11. The communications control module 43 also controls the separate flows of control data and user data (for uplink and downlink) that are to be transmitted to the base station 5, to the access point 11.

The RRC module 45 sends and receives messages according to the RRC protocol, via the transceiver circuit 31 including, for example, the RRC messages comprising control data for indicating the mobile device's capability and preference for steering to one or more particular WLAN 12.

The WLAN module 47 controls communication via the access point 11 based on the information stored in the memory 39 of the mobile device 3 and/or based on information received from the base station 5 (e.g. in an RRC or other message). The WLAN module 47 manages the configuration and maintenance of the WLAN bearer for a mobile device 3 based on the control information received from the base station 5. The WLAN module 47 also includes WLAN preference information 48 that is provided to the base station 5 (via the RRC module 45) in order to assist the base station 5 steering the mobile device's communications to an appropriate WLAN 12.

The measurement module 49 receives control data (e.g. via the RRC module 45 using appropriate RRC signalling) for configuring signal measurement with respect to radio access networks in the vicinity of the mobile device 3, such as the WLAN 12. The measurement module 49 performs signal quality/strength measurements in accordance with the received configuration and generates and sends the base station 5 (e.g. via the RRC module 45) a report including the results of such measurements, as specified in the received control data.

Base Station

Figure 3:
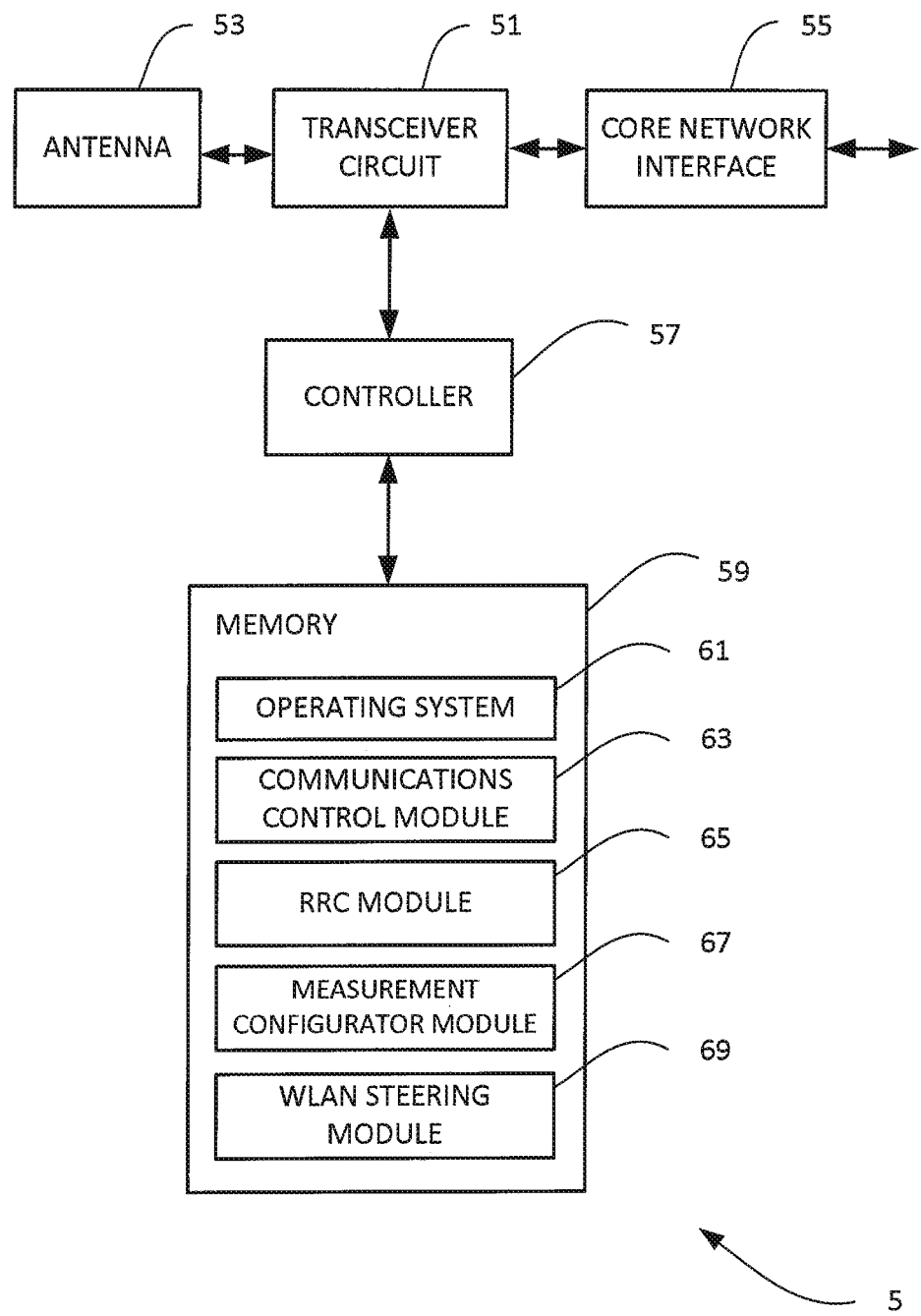
FIG. 3 is a block diagram of a base station forming part of the system shown in FIG. 1.

FIG. 3 is a block diagram illustrating the main components of the base station 5 shown in FIG. 1. As shown, the base station 5 has a transceiver circuit 51 for transmitting signals to and for receiving signals from the mobile devices 3 via one or more antenna 53, a core network interface 55 for transmitting signals to and for receiving signals from the core network entities. The base station 5 has a controller 57 to control the operation of the base station 5. The controller 57 is associated with a memory 59. Although not necessarily shown in FIG. 3, the base station 5 will of course have all the usual functionality of a cellular telephone network base station and this may be provided by any one or any combination of hardware, software and firmware, as appropriate. Software may be pre-installed in the memory 59 and/or may be downloaded via the communications network 1 or from a removable data storage device (RMD), for example. The controller 57 is configured to control the overall operation of the base station 5 by, in this example, program instructions or software instructions stored within memory 59. As shown, these software instructions include, among other things, an operating system 61, a communications control module 63, an RRC module 65, a measurement configurator module 67, and a WLAN steering module 69.

The communications control module 63 controls the communication between the base station 5 and the mobile device 3 and other network entities that are connected to the base station 5. The communications control module 63 also controls the separate flows of uplink/downlink user traffic and control data to be transmitted to the mobile devices 3 associated with this base station 5 including, for example, control data for measurement configuration and maintenance of the bearers for a mobile device 3.

The RRC module 65 is operable to generate, send and receive signalling messages formatted according to the RRC standard. For example, such messages are exchanged between the base station 5 and the mobile devices 3 that are associated with this base station 5. The RRC messages may include, for example, the RRC messages comprising control data for requesting the mobile device to measure signals of and/or to steer communications to one or more particular WLAN 12.

The measurement configurator module 67 configures the mobile telephones 3 associated with this base station 5 for carrying out signal measurements with respect to various radio access networks, such as the E-UTRAN and the WLAN 12. The measurement configurator module 67 sends the mobile device 3 control data (e.g. via the RRC module 65 using appropriate RRC signalling) specifying the type of measurements to be carried out by the mobile device 3 and the conditions for reporting the results of these measurements.

The WLAN steering module 69 controls the selection of WLAN 12 for offloading the mobile telephone's 3 communications. The WLAN steering module 69 relies on the signal quality/strength measurements reported by the mobile device 3 and also takes into account any capability/preference information provided by the mobile device 3.

In the above description, the mobile device 3 and the base station 5 are described for ease of understanding as having a number of discrete modules (such as the communications control modules and the radio resource control modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

A number of different embodiments will now be described that illustrate how different aspects of the invention can be put into effect using the above mobile device 3 and base station 5. The embodiments will be described with reference to the signalling (or 'timing') diagrams shown in FIGS. 4 to 7.

Operation

Figure 4:
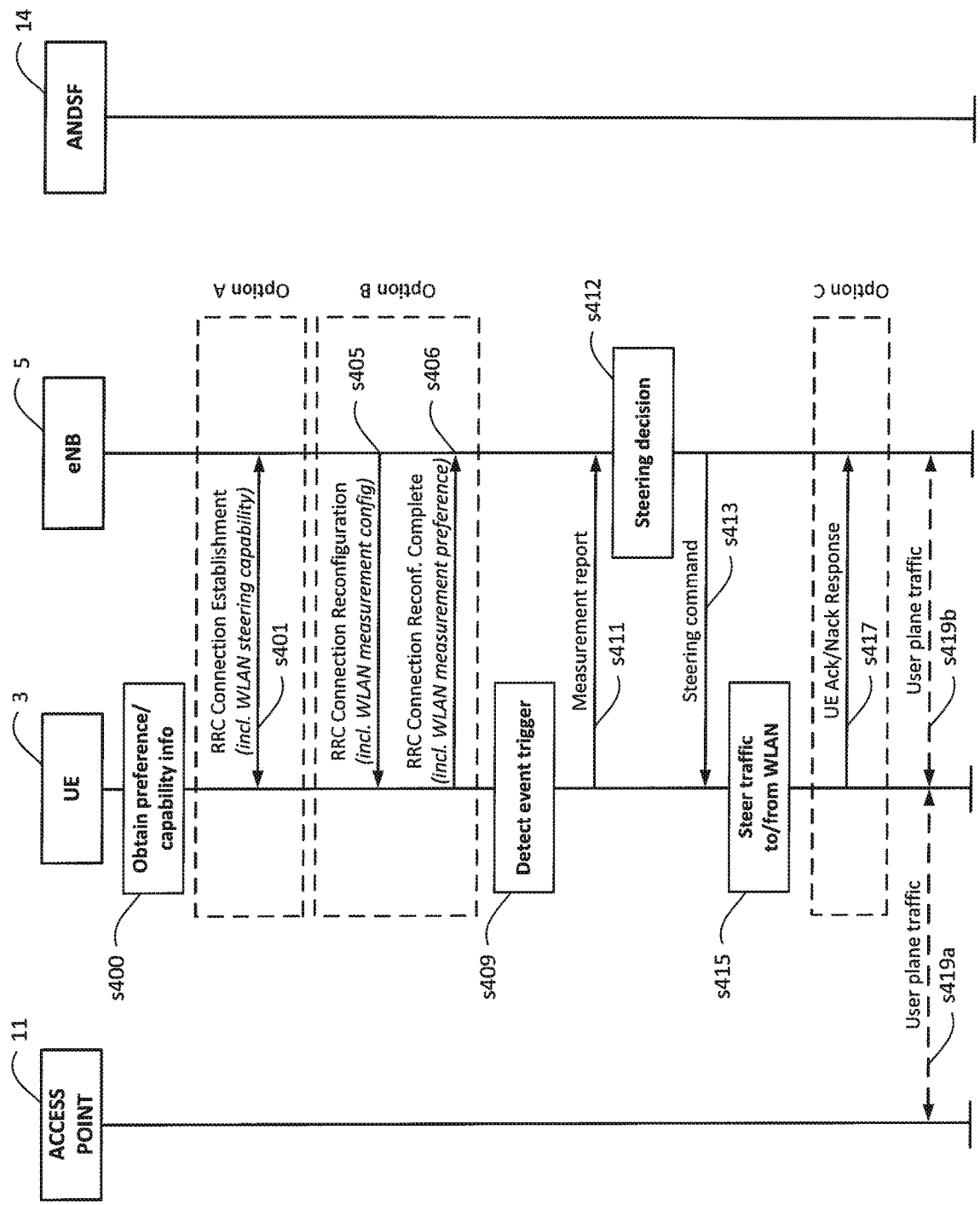
FIG. 4 is a signalling diagram indicating exemplary procedures by which the mobile device indicates a preference for communicating via a WLAN in the system shown in FIG. 1.

FIG. 4 is a signalling diagram indicating exemplary procedures by which the mobile device 3 indicates a preference for communicating via a WLAN 12 in the system shown in FIG. 1. Specifically, FIG. 4 illustrates three exemplary procedures (denoted 'Option A', 'Option B', and 'Option C', respectively) by which the mobile device 3 can inform the base station 5 about its capabilities and/or preference for using an access point 11 of a particular WLAN 12 (and/or any WLAN operating in accordance with a particular communication technology).

Initially, as generally shown in step S400, the mobile device 3 obtains user preference and/or capability information. This can be achieved in any number of ways known in the art. For example, the capability information (and possibly a default user preference) may be factory configured or provided by the network operator using over the air (OTA) configuration means. User preference may also be inputted by the end user, e.g. by setting a menu item (such as a 'WLAN preference' menu item) in the mobile device 3 in accordance with the user's preference. The user preference and/or capability information may also be updated at any point in time, e.g. by the user (or the network operator) updating the configuration stored in the mobile device 3 and/or by turning on or off the WLAN module 47 and/or updating a list of preferred WLANs.

Next, as generally illustrated in step S401, in order to be able to communicate via E-UTRAN, the mobile device 3 establishes a radio connection (e.g. an RRC connection) with the base station 5. In order to do so, the RRC module 45 of the mobile device 3 generates and sends an appropriately formatted signalling message (e.g. an 'RRC Connection Request' message) to the corresponding RRC module 65 of the base station 5, which is followed up by one or more further RRC messages, as described in section 5.3.3 of the 3GPP TS 36.331 (V11.4.0) standards specification, the contents of which are incorporated herein by reference.

In one example, denoted 'Option A' in FIG. 4, the mobile device 3 includes in an RRC message to the base station 5 information identifying the mobile device's 3 WLAN steering capability (and possibly any user preference for using WLAN 12). Advantageously, this information is then used by the base station 5 in a subsequent steering procedure when it needs to offload the mobile device's 3 communications to/from the WLAN 12. For example, the received capability information may be used in steps S405 and/or S412 that will be described in detail below.

Once the mobile device 3 has completed the establishment of a radio connection with the E-UTRAN, the base station 5 is in charge of the (re-)configuration of the RRC connection between the mobile device 3 and the base station 5. In order to do so, the base station 5 (using its RRC module 65) can send control data in one or more appropriately formatted RRC signalling messages to the mobile device 3 (to be received by the RRC module 45), the control data specifying actions to be performed by the mobile device 3 to conform with the base station's 5 reconfiguration request. Further details of the RRC connection reconfiguration procedure are described in section 5.3.5 of the 3GPP TS 36.331 standards specification, the contents of which are incorporated herein by reference.

In one example, denoted 'Option B' in FIG. 4, the RRC module 65 (of the base station 5) provides control data to the RRC module 45 (of the mobile device 3) for configuring signal measurements to be carried out by the measurement module 49 with respect to the WLAN 12. The RRC module 65 obtains such control data from the measurement configurator module 67. In this example, as shown in step S405, the RRC module 65 generates and sends an appropriately formatted signalling message (e.g. an 'RRC Connection Reconfiguration' message) to the RRC module 45, and also includes in this message control data identifying the measurements to be carried out by the measurement module 49 (e.g. 'WLAN measurement configuration'). Preferably, the WLAN measurement configuration is included in an information element (IE) within the RRC Connection Reconfiguration message, for example, in an information element for requesting WLAN measurements (e.g. a 'WLAN measurement' IE or a 'MeasConfig' IE). The WLAN measurement configuration (control data) may also include information identifying the WLAN 12 to be measured and/or conditions (or triggers) for reporting the measurements for WLAN 12. Sections 5.5.4 and 5.5.5 of the 3GPP TS 36.331 standards specification discloses further details of the measurement report triggering and measurement reporting procedures, respectively, the contents of which are incorporated herein by reference.

Next, as shown in step S406, the mobile device 3 confirms to the base station 5 that the requested reconfiguration of the radio connection has been completed. It does so by generating (using its RRC module 45) and sending the base station 5 an appropriately formatted signalling message (e.g. an 'RRC Connection Reconfiguration Complete' message). In the example of Option B, the mobile device 3 also includes in the message to the base station 5 information identifying the mobile device's 3 preference for carrying out measurements for WLAN 12 (and/or any other radio access network that the mobile device 3 is able to use). For example, the mobile device 3 may specify, based on information held in its WLAN module 47 (e.g. user preference information 48 and the like) any user preference for using WLAN 12 (and possibly information identifying/confirming the mobile device's 3 WLAN steering capability, irrespective whether or not this information has been provided in step S401). The mobile device 3 may also include in the message at S406 a list (e.g. a prioritised list) of WLANs that it can use or list of WLANs that it cannot use.

Advantageously, based on the information provided by the mobile device 3, the base station 5 is able to change the WLAN measurement configuration, if necessary (e.g. if the previously configured WLAN measurements cannot be performed by the mobile device 3). In this case, steps S405 and S406 may be repeated.

Once the WLAN measurements have been successfully configured for the mobile device 3, the measurement module 49 performs the requested signal measurements with respect to the WLAN 12 (e.g. measurements of signals, such as reference signals transmitted by the access point 11 belonging to the WLAN 12).

As shown in step S409, the measurement module 49 subsequently detects one or more event trigger(s), i.e. it determines that the signal measurements meet one or more condition(s) specified in the received control data (WLAN measurement configuration) for initiating reporting of the measurement results to the base station 5. Therefore, the mobile device 3 proceeds to step S411, in which it generates (using its RRC module 45) and sends the base station 5 an appropriately formatted signalling message (e.g. a 'Measurement Report' message) and also includes in this message the results of the relevant signal measurements for WLAN 12.

Upon receipt of the measurement report, the base station 5 (using its WLAN steering module 69) makes an appropriate steering decision for the mobile device 3, by also taking into account any previously received user preference and/or WLAN steering capability information for that mobile device 3. Specifically, the steering module 69 selects the WLAN 12 to be used by the mobile device 3 by taking into account any user preference and device capability information received from the mobile device 3, e.g. at S401 and/or S406.

Next, in step S413, the base station generates (using its WLAN steering module 69) and sends the mobile device 3 an appropriately formatted steering (or 'offloading') command message, and includes in this message information identifying the WLAN 12 (and/or possibly the AP 11) that has been selected for offloading the mobile device's 3 communications to. The steering command may also include an identification of the communication bearer to be offloaded and any further information necessary for the mobile device 3 to comply with the base station's 5 request.

In step S415, the mobile device 3 begins procedures for steering traffic to the WLAN, as instructed in the received steering command. For example, if the mobile device 3 is capable of (and/or the current user preference does not prevent it from) connecting to WLAN 12, the mobile device 3 initiates connection establishment with the WLAN 12 (if not yet connected) and in step S417, the mobile device 3 generates and sends an appropriately formatted confirmation message (or an acknowledgement, e.g. an 'Pick' message) to the base station 5, informing the base station 5 that the mobile device 3 is able to comply with the steering command received at S413. Therefore, as generally illustrated at step S419a, after the 'Pick' response is sent, the mobile device 3 begins communicating (user plane traffic) via the access point 11 of the WLAN 12 (although it may optionally also continue communicating via the base station 5 in parallel, as generally illustrated in step S419b).

However, if the mobile device 3 is not capable of (and/or the current user preference prevents it from) connecting to AP 11/WLAN 12, in step S417 the mobile device 3 generates and sends an appropriately formatted negative acknowledgement message (e.g. a 'Nack' message) to the base station 5. In this example, denoted 'Option C' in FIG. 4, by sending a 'Nack' response, the mobile device 3 provides a preference indication to the base station 5 (e.g. that the AP 11/WLAN 12 is not preferred by the user). The mobile device 3 may possibly also include in the 'Nack' response a reason/cause of not complying with the base station's 5 steering command, e.g. due to user preference and/or device capabilities. Accordingly, the base station 5 will be able to determine from the 'Nack' response (and any indication included therein) that the mobile device's 3 'Nack' response indicates a user preference/device capability rather than an error in establishing the desired WLAN connection. Advantageously, the received user preference/device capability can be used by the measurement configurator module 67 in subsequent measurement configurations and/or the WLAN steering module 69 in its subsequent steering decisions for this mobile device 3 and may in turn result in a more efficient usage of the system resources.

Finally, if the mobile device 3 is unable to (or prefers not to) connect to the WLAN 12 selected by the base station 5, after sending the 'Nack' response, any user plane traffic for the mobile device 3 remains routed via the base station 5, as generally illustrated in step S419b.

In summary, the mobile device 3 is able to provide information identifying its capabilities/preferences to the base station 5 during establishment of a radio connection with the base station 5 (at S401), during configuration of the WLAN measurements (at S406), during reporting measurement results associated with the configured WLAN measurements (at S411), and/or when responding to a steering request by the base station 5 (at S417).

In this example, the mobile device 3 also beneficially maintains information relating to which WLANs can be used by the mobile device 3 and under what conditions the WLANs can be used. For example, the mobile device 3 may hold information identifying which WLANs are controlled by (and/or associated with) the network operator, which WLANs are permitted to use by the mobile device 3, which WLANs are prioritised (whether or not such WLANs are controlled by the network operator), and/or which WLANs support Quality of Service (QoS) functionality. In this respect, the term QoS functionality refers to the WLAN's ability to transport traffic flows having special requirements (e.g. such as a required bit rate, allowed delay, jitter, packet dropping probability, and/or bit error rate). Such information may be obtained by the mobile device 3 directly from the WLANs 12 themselves (e.g. by scanning access points 11/listening to information transmitted by the access points 11 of each WLAN 12 in the vicinity of the mobile device 3). The information may also be obtained from the ANDSF 14 or a similar entity, such as an Open Mobile Alliance (OMA) Device Management (DM) server (not shown).

Figure 5:
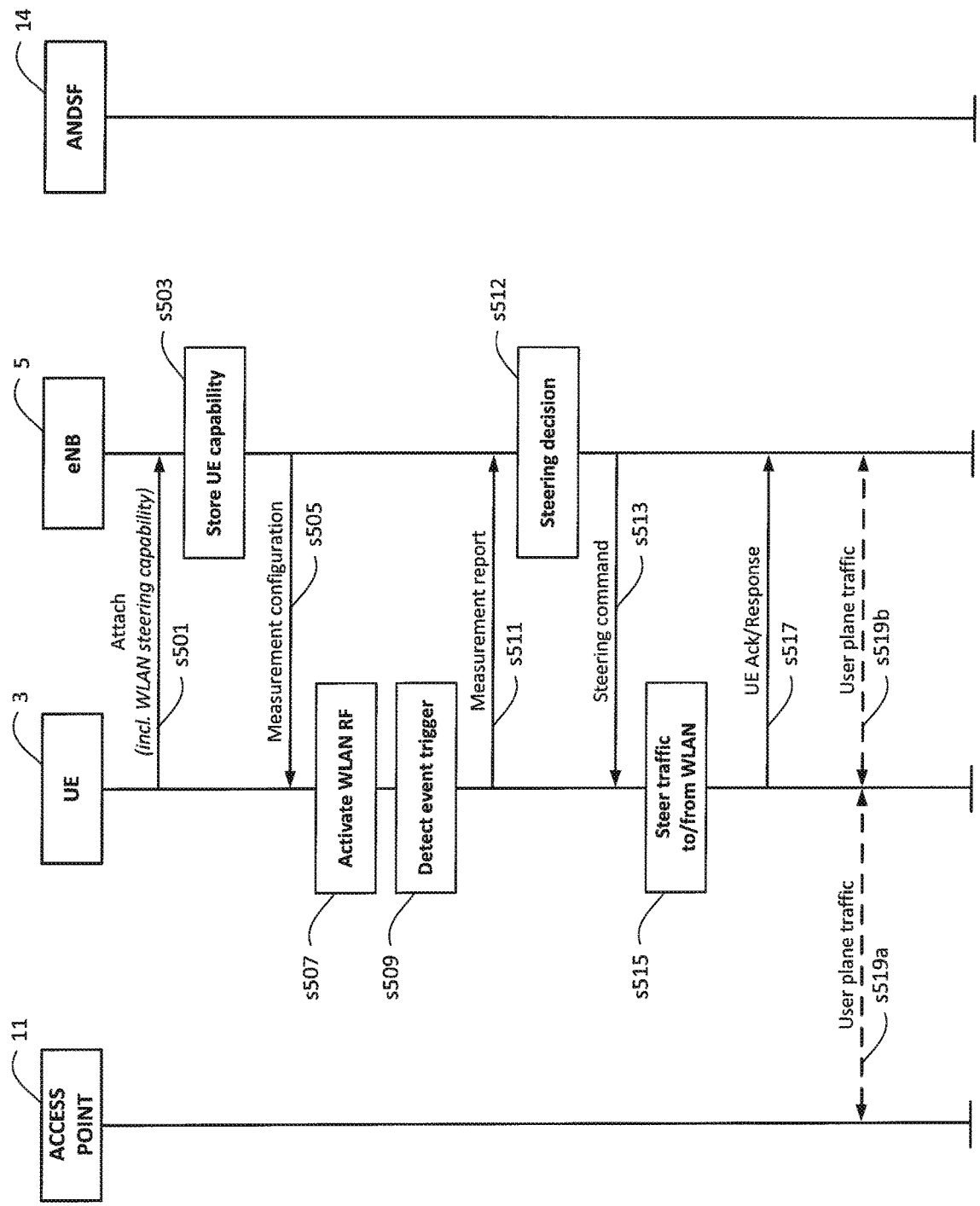
FIG. 5 is a signalling diagram indicating an exemplary procedure by which the radio access network decides on steering a mobile device's communications to/from a WLAN in the system shown in FIG. 1.

FIG. 5 is a signalling diagram indicating an exemplary procedure by which the radio access network decides on steering a mobile device's 3 communications to/from a WLAN 12 in the system shown in FIG. 1. In this example, even though the base station 5 may disregard any user preference for WLAN communication, the base station 5 selects a WLAN 12 such that the mobile device 3 is capable of communicating via the selected WLAN 12.

Initially, as shown in step S501, the mobile device 3 initiates an attach procedure with the network, e.g. by generating and sending an appropriately formatted 'Attach' request to the base station 5. The attach procedure also includes the radio connection establishment procedure described above with reference to step S401. However, in this case the mobile device 3 includes in the Attach request an indication of its WLAN/3GPP RAN interworking capability, e.g. 'Yes' or 'No'. Advantageously, the mobile device 3 may also include in the request (at S501) additional details of the interworking capability, e.g. information identifying any of the following:

bands/frequencies supported by the mobile device 3;
the mobile device's 3 capability with simultaneous connections to the WLAN and E-UTRA (e.g. WiFi and LTE, respectively); and
the mobile device's 3 capability with IP Flow Mobility (IFOM) and/or Multi Access PDN Connectivity (MAPCON).

In step S503, the base station 5 stores the received interworking capability information in its memory 59 and makes it accessible for its modules, such as the measurement configurator module 67 and/or the WLAN steering module 69.

Accordingly, when the measurement configurator module 67 prepares control data (for configuring signal measurements with respect to the WLAN 12) for sending to the mobile device 3, the measurement configurator module 67 is able to consider any. Therefore, in this example, the control data configures measurements for the mobile device 3 only in case the interworking capability information for that mobile device 3 indicates that this particular mobile device 3 is capable of using the WLAN 12 to be measured.

Next, as shown in step S505, the RRC module 65 generates and sends an appropriately formatted signalling message (e.g. an 'RRC Connection Reconfiguration' message) to the mobile device's 3 RRC module 45, and also includes in this message the control data (from the measurement configurator module 67) identifying the measurements to be carried out by the mobile device 3 (e.g. 'WLAN measurement configuration').

In step S507, in response to receiving the WLAN measurement configuration, the mobile device 3 activates its WLAN module 47 (if it has not been activated already) and proceeds to carry out WLAN signal measurements and associated reporting, as generally illustrated in steps S509 and S511. Based on the reported measurements, the base station 5 then makes a steering decision in step S512 and sends a steering command to the mobile device 3 in step S513.

Since the control data (or WLAN measurement configuration) received at S505 is for such WLAN(s) only that the mobile device 3 has indicated to be compatible with, any subsequent steering decision made by the WLAN steering module 69 (based on a WLAN measurement report corresponding to the control data) will result in the selection of a compatible WLAN 12 for the mobile device 3. This in turn ensures that service continuity for the mobile device 3 can be maintained and that the overall system efficiency can be improved (whilst possibly also reducing the load of the base station 5 after steering the mobile device's 3 communications to the WLAN 12).

Since steps S509 to S519a/b generally correspond to steps S409 to S419a/b of FIG. 4, respectively, their detailed description is omitted here.

Figure 6:
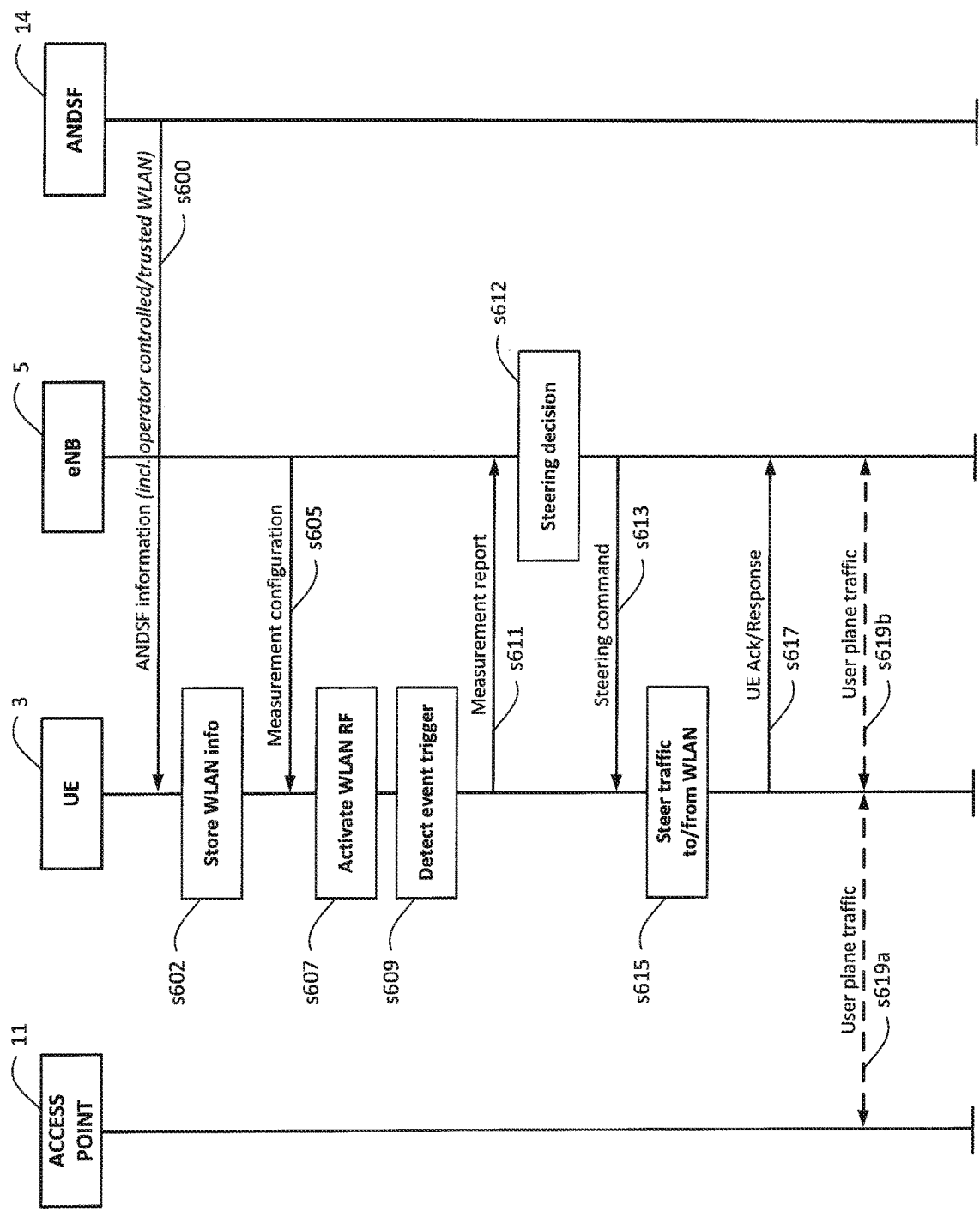
FIG. 6 is a signalling diagram indicating a variation on the procedure shown in FIG. 5.

FIG. 6 is a signalling diagram indicating a variation on the procedure shown in FIG. 5. In this example, the mobile device 3 assists the selection of a compatible WLAN 12 by filtering the WLAN measurement reports sent to the base station 5 in accordance with WLAN information held by the mobile device 3.

Specifically, in this example the mobile device 3 obtains information from the ANDSF 14, as generally illustrated in step S600, which includes information identifying WLANs controlled/trusted by the network operator. For example, the obtained information may include any of the following:

identification of one or more WLANs controlled by the network operator (e.g. an operator WLAN list);
identification of one or more WLANs trusted by the network operator (e.g. a trusted WLAN list);
identification of one or more WLANs prioritised by the network operator (e.g. a WLAN priority list);
identification of one or more WLANs not trusted by the network operator (e.g. a banned WLAN list); and
identification of one or more candidate WLANs in the vicinity of the mobile device 3 (e.g. a neighbour WLAN list).

In step S602, the mobile device 3 stores the obtained information in its memory 39 and makes it accessible for its modules, such as the WLAN module 47 and/or the measurement module 49, and controls their operation accordingly.

Advantageously, when the base station 5 sends control data (for configuring signal measurements with respect to the WLAN 12) in step S605, which control data might or might not take into account any interworking capability information for the mobile device 3, using the obtained information the mobile device 3 is able to selectively measure and/or report, to the base station 5, only those WLANs that are most likely to result in a successful steering procedure.

For example, the measurement module 49 can be configured to carry out measurements with respect to such WLANs that are controlled/trusted or otherwise have been indicated (either explicitly or implicitly) as being a suitable candidate for the mobile device 3 (e.g. WLANs that are not banned). Therefore, at step S609, only those event triggers will detected (and/or acted upon) that are for suitable WLANs whilst event triggers for banned/unknown/unverified WLANs may be ignored.

Even if the measurement module 49 performs signal measurements for all WLANs requested by the base station 5 and acts upon each event trigger, the mobile device 3 will only report those WLANs (in step S611) that have been confirmed to be compatible with the mobile device 3 (based on the mobile device's WLAN capability) and that are also available for the mobile device 3 to use (based on the information obtained at S600).

In this example, the mobile device 3 may selectively report any of the following measurements (i.e. rather than all configured measurements):

measurements for allowed/recommended WLAN(s) (as per information obtained via the ANDSF); and
measurements for WLAN(s) to which traffic steering can be performed by the mobile device 3 (e.g. a WLAN that is not overloaded, that is accessible/trusted/operator controlled/provides an acceptable QoS).

In any case, since the measurement report sent at S611 is for such WLAN(s) only that the mobile device 3 is compatible with and allowed to use, any subsequent steering decision made based on such WLAN measurement report (by the WLAN steering module 69) will result in the selection of a compatible WLAN 12 for the mobile device 3. This in turn ensures that service continuity for the mobile device 3 can be maintained and that the overall system efficiency can be improved (whilst possibly also reducing the load of the base station 5 after steering the mobile device's 3 communications to the WLAN 12).

Since steps S612 to S619a/b generally correspond to steps S412 to S419a/b, respectively, their detailed description is omitted here.

Figure 7:
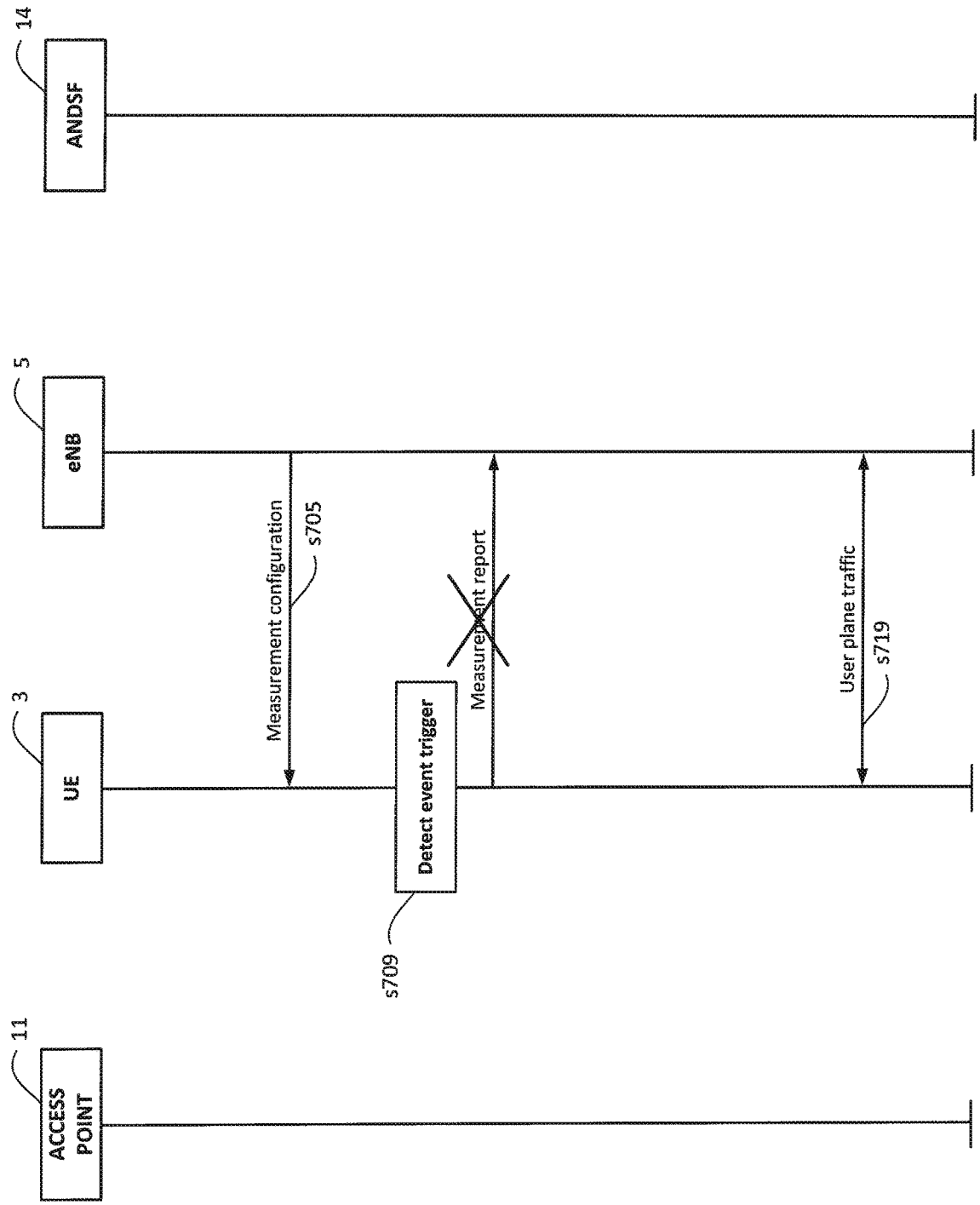
FIG. 7 is a signalling diagram indicating a variation on the procedures shown in FIGS. 4 to 6.

FIG. 7 is a signalling diagram indicating a variation on the procedures shown in FIGS. 4 to 6. In this example, only the measurement configuration step (S705, which generally corresponds to steps S405/S505/S605 described above) and the event trigger detection step (S709, which generally corresponds to steps S409/S509/S609 described above) are shown—although the trigger detection step is optional in this case.

However, as indicated in FIG. 7, in this case the mobile device 3 does not provide any measurement report to the base station 5, thereby 'implicitly' indicating its preference for not steering any traffic to the WLAN 12 (or that the mobile device 3 is not capable to do so). Therefore, irrespective of the configured WLAN measurements and/or whether any capability or user preference information has already been provided to the base station 5, the mobile device 3 is beneficially able to provide an implicit preference/capability indication without being wasteful of the system resources. This approach in turn results in the base station 5 being unable to send any steering command to the mobile device 3, and hence the mobile device 3 (in accordance with its preference/capability) can continue to route its user plane traffic via the base station 5, as generally shown in step S719.

MODIFICATIONS AND ALTERNATIVES

Detailed embodiments have been described above. As those skilled in the art will appreciate, a number of modifications and alternatives can be made to the above embodiments whilst still benefiting from the inventions embodied therein. By way of illustration only a number of these alternatives and modifications will now be described.

In the above embodiments, the mobile device communicates with a base station to indicate its WLAN/3GPP RAN interworking capability/user preference. However, it will be appreciated that the mobile device may communicate with a Radio Network Controller (RNC) instead of a base station (eNB).

In the above embodiments, the mobile device received the WLAN measurement configuration from and provided the measurement reports to a base station (eNB). It will be appreciated that the mobile device might receive the WLAN control information from and send measurement reports to any base station operating according to a different standard, such as GSM, WCDMA, CDMA2000, LTE, LTE-A. Such base stations can be referred to as BS, BTS, NodeB, etc. Alternatively, the WLAN measurement configuration might be received from (and measurement reports sent to) the base station indirectly, e.g. using a relay node (RN) or a donor base station (DeNB).

In the above embodiments, the mobile device received the WLAN measurement configuration via a base station. It will be appreciated that the mobile device might receive the WLAN measurement configuration via an access point, e.g. if the mobile device is already using this access point. Alternatively, the WLAN measurement configuration might be sent in two or more parts. In this case, some or all parts of the WLAN measurement configuration might be received via a base station, and some or all parts might be received via an access point.

The above embodiment has described a preferred way of generating WLAN measurement configuration information and the preferred way of signalling that information to the mobile device for steering of the mobile device's communications to the WLAN. As those skilled in the art will appreciate, other signalling messages may be used. Further, it will also be appreciated that the above embodiments are also applicable for steering the mobile device's communications from a WLAN already used by that mobile device to a different WLAN and/or to the base station.

In the above description of FIG. 4, three options (Options A, Option B, and Option C) are discussed. However, Options A to C are not to be interpreted as being mutually exclusive embodiments. On the contrary, it will be appreciated that any two (or even all three) options may be combined.

In the above description of the embodiments illustrated in FIGS. 5 and 6, the two embodiments have been discussed as separate procedures. However, it will also be appreciated that the embodiments shown in FIGS. 5 and 6 may also be combined.

In the above description of FIG. 7, the provision of an implicit preference indication (i.e. the omission of measurement reporting) has been described as a standalone procedure. However, it will also be appreciated that such implicit preference indication may also be combined with any other embodiment, preferably with one or more of option A/B of FIG. 4, the embodiment shown in FIG. 5, and the embodiment shown in FIG. 6.

In the above description of step S501, for sake of simplicity, the base station is described to receive the mobile device's interworking capability information directly from the mobile device. However, it will also be appreciated that the mobile device may send such interworking capability information to a core network entity, e.g. the MME, instead of sending it to the base station. In this case the base station may receive the interworking capability information for that mobile device from the core network entity receiving/storing the interworking capability information.

In the above description, the mobile device is described to send interworking capability information to the base station using RRC signalling. However, it will also be appreciated that the mobile device may also send its interworking capability information using Non-Access Stratum (NAS) signalling (e.g. a NAS Attach signalling message sent to the base station and/or the MME).

In the above embodiments, the mobile devices are cellular telephones. It will be appreciated that the above embodiments could be implemented using devices other than mobile telephones such as, for example, personal digital assistants, laptop computers, web browsers, etc.

In the above embodiments, the term access point has been used for illustrative purposes only and in no way shall be considered limiting the invention to any particular standard. Embodiments of the invention are applicable to systems using any type of node for accessing a local area network irrespective of the access technology used thereon. In the above embodiments, WLAN has been used as an example non-3GPP radio access technology. However, any access technologies covered in the 3GPP TS 23.402 standard, thus any other radio access technology (i.e. WiFi, WiMAX) or any wired or wireless communications technology (i.e. LAN, Bluetooth) can be used for steering (offloading) traffic to/from an E-UTRAN in accordance with the above embodiments. The above embodiments are applicable to non-mobile or generally stationary user equipment as well.

In the above embodiments, a number of software modules were described. As those skilled in the art will appreciate, the software modules may be provided in compiled or un-compiled form and may be supplied to the base station or to the mobile device as a signal over a computer network, or on a recording medium. Further, the functionality performed by part or all of this software may be performed using one or more dedicated hardware circuits. However, the use of software modules is preferred as it facilitates the updating of the base station and the mobile device in order to update their functionalities.

In order to support network controlled interworking, the user preference (with respect to WLAN usage) and/or steering related device capability information may be stored in the core network rather than provided directly by the mobile device to the base station. For example, the user preference may be stored in the Home Subscriber Server (HSS) as part of the subscription data, in a so called Policy and Charging Rules Function (PCRF), and/or in the MME. Such user preference information can then be transferred from the core network entity storing the user preference to the base station serving the mobile device of that user. However, this could result in out of date information causing incorrect WLAN selection and/or steering commands being issued (or not issued) incorrectly.

Various other modifications will be apparent to those skilled in the art and will not be described in further detail here.

This invention has been described by way of embodiments above, but this invention is not limited to the embodiments. A part or the entirety of the above-mentioned embodiments may be described by way of the following supplementary notes, but this invention is not limited to the following supplementary notes.

(Supplementary Note 1)
A communication device for use in a cellular communication network comprising a base station and for use in a local area network comprising an access point, the communication device comprising:
means for communicating:
 i) with said base station via a first communication path; and
 ii) with said access node via a second communication path;
means for providing, to said base station, an indication of whether or not the communication device is enabled to use said second communication path;
means for receiving, from said base station and in dependence on said indication of whether or not the communication device is enabled to use said second communication path, control data for changing between said first and said second communication paths; and
means for changing between said first and said second communication paths in accordance with said control data.

(Supplementary Note 2)
The communication device of supplementary note 1, wherein said communicating means is operable to communicate via said first communication path using a first radio access technology and to communicate via said second communication path using a second radio access technology.

(Supplementary Note 3)
The communication device of supplementary note 1 or 2, wherein said communication device can be enabled (or not enabled) to use said second communication path by means of a user preference indicating that a user is willing (or unwilling) to allow use of said second communication path and wherein said indication of whether or not the communication device is enabled comprises an indication of said user preference.

(Supplementary Note 4)
The communication device of supplementary note 2, wherein said indication of whether or not the communication device is enabled to use said second communication path comprises an indication of a user preference indicating that use of said second radio access technology has been (or has not been) allowed.

(Supplementary Note 5)
The communication device of any of supplementary notes 3 or 4, wherein said indication of whether or not the communication device is enabled to use said second communication path comprises an indication of a user preference indicating use of a particular local area network is preferred (or is not preferred) over use of said cellular communication network.

(Supplementary Note 6)
The communication device of any of supplementary notes 1 to 5, further comprising means for maintaining a list of local area networks that said communication device is capable of and/or permitted to use (e.g. a list of operator controlled local area networks, a list of trusted local area networks, a list of preferred local area networks, a list of whitelisted local area networks) and wherein said indication of whether or not the communication device is enabled to use said second communication path comprises an indication of whether or not said particular local area network is included in said list.

(Supplementary Note 7)
The communication device of any of supplementary notes 1 to 5, further comprising means for maintaining a list of local area networks that said communication device is not capable of and/or not permitted to use (e.g. a list of banned local area networks, a list of blacklisted local area networks, a list of unauthorised local area networks, a list of local area networks incompatible) and wherein said indication of whether or not the communication device is enabled to use said second communication path comprises an indication of whether or not said particular local area network is included in said list.

(Supplementary Note 8)
The communication device of any of supplementary notes 1 to 7, wherein said indication of whether or not the communication device is enabled to use said second communication path comprises an indication of a capability of said communication device for communicating using said second communication path.

(Supplementary Note 9)
The communication device of supplementary note 8, wherein said indication of whether or not the communication device is enabled to use said second communication path comprises information identifying at least one of: bands/frequencies supported by said communication device; a capability of said communication device for communicating simultaneously via said first and said second communication paths; a capability of said communication device for Internet Protocol Flow Mobility, IFOM; and a capability of said communication device for Multi Access Packed Data Network Connectivity, MAPCON.

(Supplementary Note 10)

The communication device of any of supplementary notes 1 to 9, wherein said providing means is operable to provide said indication of whether or not the communication device is enabled to use said second communication path by sending at least one signalling message to said base station via said first communication path.

(Supplementary Note 11)

The communication device of supplementary note 10, wherein said providing means is operable to provide said indication of whether or not the communication device is enabled to use said second communication path using at least one information element, IE, included in said at least one signalling message sent to said base station via said first communication path.

(Supplementary Note 12)

The communication device of any of supplementary notes 1 to 10, wherein said providing means is operable to provide said indication of whether or not the communication device is enabled to use said second communication path by omitting to send at least one expected signalling message to said base station via said first communication path.

(Supplementary Note 13)

The communication device of any of supplementary notes 1 to 12, wherein said means for providing said indication of whether or not the communication device is enabled to use said second communication path is operable to provide said indication prior to a steering procedure being initiated for said communication device.

(Supplementary Note 14)

The communication device of supplementary note 13, wherein said means for providing said indication of whether or not the communication device is enabled to use said second communication path is operable to provide said indication as part of a procedure for attaching the communication device to said communication system (e.g. an attach procedure forming part of a Non-Access Stratum Procedure).

(Supplementary Note 15)

The communication device of supplementary note 13 or 14, wherein said means for providing said indication of whether or not the communication device is enabled to use said second communication path is operable to provide said indication as part of a radio connection establishment procedure between said communication device and said base station.

(Supplementary Note 16)

The communication device of any of supplementary notes 13 to 15, wherein said means for providing said indication of whether or not the communication device is enabled to use said second communication path is operable to provide said indication by sending at least one signalling message during an establishment of said first communication path.

(Supplementary Note 17)

The communication device of supplementary note 16, wherein said at least one signalling message sent during said establishment of said first communication path comprises at least one Radio Resource Control, RRC, signalling message, e.g. a 'RRC Connection Establishment' message.

(Supplementary Note 18)

The communication device of any of supplementary notes 1 to 17, wherein said means for providing said indication of whether or not the communication device is enabled to use said second communication path is operable to provide said indication in response to signalling associated with initiation of a steering procedure for said communication device.

(Supplementary Note 19)

The communication device of supplementary note 18, wherein said signalling associated with initiation of a steering procedure comprises configuration information for configuring signal measurements for signals from said access point.

(Supplementary Note 20)

The communication device of supplementary note 19, wherein said at least one signalling message comprises at least one 'RRC Connection Reconfiguration Complete' message.

(Supplementary Note 21)

The communication device of supplementary note 19 or 20, wherein said providing means is operable to provide said indication of whether or not the communication device is enabled to use said second communication path by sending at least one signalling message in response to said communication device receiving said configuration information for configuring signal measurements.

(Supplementary Note 22)

The communication device of supplementary note 21, wherein said providing means is operable to provide said indication of whether or not the communication device is enabled to use said second communication path by sending at least one measurement report comprising results of measurements made responsive to said configuration information for configuring signal measurements.

(Supplementary Note 23)

The communication device of supplementary note 21 or 22, wherein said providing means is operable to provide said indication of whether or not the communication device is enabled to use said second communication path by omitting to provide at least one measurement report comprising results of measurements made responsive to said configuration information for configuring signal measurements.

(Supplementary Note 24)

The communication device of any of supplementary notes 1 to 23, wherein said means for providing said indication of whether or not the communication device is enabled to use said second communication path is operable to provide said indication as part of a steering procedure comprising said request by said base station to change from said first communication path to said second communication path for said communication device (e.g. to be used by said base station in a subsequent steering procedure).

(Supplementary Note 25)

The communication device of supplementary note 24, wherein said providing means is operable to provide said indication of whether or not the communication device is enabled to use said second communication path by sending a negative acknowledgement, Nack, in response to said request by said base station to change from said first communication path to said second communication path.

(Supplementary Note 26)

The communication device of any of supplementary notes 1 to 25, comprising user equipment operating in accordance with the Long Term Evolution, LTE, standards.

(Supplementary Note 27)

A base station for controlling a communication device operable to communicate via at least one of said base station and an access point of a local area network, the base station comprising:

means for communicating with the communication device using a first communication path;

means for obtaining, from said communication device, an indication of whether or not the communication device is enabled to use a second communication path via said access point; and means for providing, to said communication device and in dependence on said indication of whether or not the communication device is enabled to use said second communication path, control data for changing between said first communication path and said second communication path.

(Supplementary Note 28)

The base station of supplementary note 27 wherein said communication device is operable to communicate with said base station via said first communication path using a first radio access technology and to communicate with said access point via said second communication path using a second radio access technology.

(Supplementary Note 29)

The base station of supplementary note 27 or 28, wherein said communication device can be enabled (or not enabled) to use said second communication path by means of a user preference indicating that a user is willing (or unwilling) to allow use of said second communication path and wherein said indication of whether or not the communication device is enabled comprises an indication of said user preference.

(Supplementary Note 30)

The base station of supplementary note 28, wherein said indication of whether or not the communication device is enabled to use said second communication path comprises an indication of a user preference indicating that use of said second radio access technology has been (or has not been) allowed.

(Supplementary Note 31)

The base station of any of supplementary notes 29 or 30, wherein said indication of whether or not the communication device is enabled to use said second communication path comprises an indication of a user preference indicating use of a particular local area network is preferred (or is not preferred) over use of said cellular communication network.

(Supplementary Note 32)

The base station of any of supplementary notes 27 to 31, further comprising means for maintaining a list of local area networks that said communication device is capable of and/or permitted to use (e.g. a list of operator controlled local area networks, a list of trusted local area networks, a list of preferred local area networks, a list of whitelisted local area networks) and wherein said maintaining means is operable to include in said list said particular local area networks when said indication indicates that the communication device is enabled to use said second communication path.

(Supplementary Note 33)

The base station of any of supplementary notes 27 to 31, further comprising means for maintaining a list of local area networks that said communication device is not capable of and/or not permitted to use (e.g. a list of banned local area networks, a list of blacklisted local area networks, a list of unauthorised local area networks, a list of local area networks incompatible) and wherein said maintaining means is operable to include in said list said particular local area networks when said indication indicates that the communication device is not enabled to use said second communication path.

(Supplementary Note 34)

The base station of any of supplementary notes 27 to 33, wherein said indication of whether or not the communication device is enabled to use said second communication path comprises an indication of a capability of said communication device for communicating using said second communication path.

(Supplementary Note 35)

The base station of supplementary note 34, wherein said indication of whether or not the communication device is enabled to use said second communication path comprises information identifying at least one of: bands/frequencies supported by said communication device; a capability of said communication device for communicating simultaneously via said first and said second communication paths; a capability of said communication device for Internet Protocol Flow Mobility, IFOM; and a capability of said communication device for Multi Access Packed Data Network Connectivity, MAPCON.

(Supplementary Note 36)

The base station of any of supplementary notes 27 to 35, wherein said obtaining means is operable to obtain said indication of whether or not the communication device is enabled to use said second communication path by receiving at least one signalling message from said communication device via said first communication path.

(Supplementary Note 37)

The base station of supplementary note 36, wherein said obtaining means is operable to obtain said indication of whether or not the communication device is enabled to use said second communication path using at least one information element, IE, included in said at least one signalling message received from said communication device via said first communication path.

(Supplementary Note 38)

The base station of any of supplementary notes 27 to 37, wherein said obtaining means is operable to obtain said indication of whether or not the communication device is enabled to use said second communication path by determining that at least one expected signalling message from said communication device has not been received.

(Supplementary Note 39)

The base station of any of supplementary notes 27 to 38, wherein said means for obtaining said indication of whether or not the communication device is enabled to use said second communication path is operable to obtain said indication prior to the base station initiating a steering procedure for said communication device.

(Supplementary Note 40)

The base station of supplementary note 39, wherein said means for obtaining said indication of whether or not the communication device is enabled to use said second communication path is operable to obtain said indication as part of a procedure for attaching the communication device to said communication system (e.g. an attach procedure forming part of a Non-Access Stratum Procedure).

(Supplementary Note 41)

The base station of supplementary note 39 or 40, wherein said means for obtaining said indication of whether or not the communication device is enabled to use said second communication path is operable to obtain said indication as part of a radio connection establishment procedure between said communication device and said base station.

(Supplementary Note 42)

The base station of any of supplementary notes 39 to 41, wherein said means for obtaining said indication of whether or not the communication device is enabled to use said second communication path is operable to obtain said indication by receiving at least one signalling message during an establishment of said first communication path.

(Supplementary Note 43)

The base station of supplementary note 42, wherein said at least one signalling message received during said establishment of said first communication path comprises at least one Radio Resource Control, RRC, signalling message, e.g. a 'RRC Connection Establishment' message.

(Supplementary Note 44)

The base station of any of supplementary notes 27 to 43, wherein said means for obtaining said indication of whether or not the communication device is enabled to use said second communication path is operable to obtain said indication in response to signalling associated with initiation of a steering procedure for said communication device.

(Supplementary Note 45)

The base station of supplementary note 44, wherein said signalling associated with initiation of a steering procedure comprises configuration information for configuring signal measurements for signals from said access point.

(Supplementary Note 46)

The base station of supplementary note 45, wherein said at least one signalling message comprises at least one 'RRC Connection Reconfiguration Complete' message.

(Supplementary Note 47)

The base station of supplementary note 45 or 46, wherein said obtaining means is operable to obtain said indication of whether or not the communication device is enabled to use said second communication path by receiving at least one signalling message in response to said base station sending said configuration information for configuring signal measurements.

(Supplementary Note 48)

The base station of supplementary note 47, wherein said obtaining means is operable to obtain said indication of whether or not the communication device is enabled to use said second communication path by receiving at least one measurement report comprising results of measurements made responsive to said configuration information for configuring signal measurements.

(Supplementary Note 49)

The base station of supplementary note 47 or 48, wherein said obtaining means is operable to obtain said indication of whether or not the communication device is enabled to use said second communication path by determining that at least one measurement report comprising results of measurements made responsive to said configuration information for configuring signal measurements has been omitted by said communication device.

(Supplementary Note 50)

The base station of any of supplementary notes 27 to 49, wherein said means for obtaining said indication of whether or not the communication device is enabled to use said second communication path is operable to obtain said indication as part of a steering procedure comprising said request by said base station to change from said first communication path to said second communication path for said communication device (e.g. to be used by said base station in a subsequent steering procedure).

(Supplementary Note 51)

The base station of supplementary note 50, wherein said obtaining means is operable to obtain said indication of whether or not the communication device is enabled to use said second communication path by receiving a negative acknowledgement, Nack, in response to said request by said base station to change from said first communication path to said second communication path.

(Supplementary Note 52)

The base station of any of supplementary notes 27 to 51, comprising means for configuring signal measurements for signals from said access point in dependence of said obtained indication of whether or not the communication device is enabled to use said second communication path.

(Supplementary Note 53)

The base station of any of supplementary notes 27 to 52, comprising means for requesting said communication device to change from said first communication path to said second communication path in dependence of said obtained indication of whether or not the communication device is enabled to use said second communication path.

(Supplementary Note 54)

The base station of any of supplementary notes 27 to 53, comprising a base station operating in accordance with the Long Term Evolution, LTE, standards.

(Supplementary Note 55)

A system comprising the communication device of any of supplementary notes 1 to 26 and the base station of any of supplementary notes 27 to 54.

(Supplementary Note 56)

A communication device for use in a cellular communication network comprising a base station and for use in a local area network comprising an access point, the communication device comprising a processor and a transceiver, wherein:

the transceiver is configured to:

communicate with said base station via a first communication path; and to communicate with said access node via a second communication path;

provide, to said base station, an indication of whether or not the communication device is enabled to use said second communication path; and receive, from said base station and in dependence on said indication of whether or not the communication device is enabled to use said second communication path, control data for changing between said first and said second communication paths; and the processor is configured to change between said first and said second communication paths in accordance with said control data.

(Supplementary Note 57)

A base station for controlling a communication device operable to communicate via at least one of said base station and an access point of a local area network, the base station comprising a processor and a transceiver, wherein the transceiver is configured to:

communicate with the communication device using a first communication path;

obtain, from said communication device, an indication of whether or not the communication device is enabled to use a second communication path via said access point; and provide, to said communication device and in dependence on said indication of whether or not the communication device is enabled to use said second communication path, control data for changing between said first communication path and said second communication path.

(Supplementary Note 58)

A method performed by a communication device operable to communicate with a base station of a cellular communication network via a first communication path and to communicate with an access point of a local area network via a second communication path, the method comprising:

providing, to said base station, an indication of whether or not the communication device is enabled to use said second communication path;

receiving, from said base station and in dependence on said indication of whether or not the communication device is enabled to use said second communication path, control data for changing between said first and said second communication paths; and changing to said second communication path or maintaining said first communication path in dependence on said receiving, from said base station in dependence on said indication of whether or not the communication device is enabled to use said second communication path, control data for changing between said first and said second communication paths.

(Supplementary Note 59)

A method according to supplementary note 58 wherein said receiving, from said base station and in dependence on said indication of whether or not the communication device is enabled to use said second communication path, control data for changing between said first and said second communication paths comprises:

receiving said control data for changing between said first and said second communication paths when said indication of whether or not the communication device is enabled to use said second communication path indicates that said device is enabled to use said second communication path; and not receiving said control data for changing between said first and said second communication paths when said indication of whether or not the communication device is enabled to use said second communication path indicates that said device is not enabled to use said second communication path.

(Supplementary Note 60)

A method performed by a base station of a cellular communication network for controlling a communication device wherein the communication device is operable to communicate with said base station via a first communication path, and operable to communicate with an access point of a local area network via a second communication path, the method comprising:

obtaining, from said communication device, an indication of whether or not the communication device is enabled to use said second communication path via said access point; and providing, in dependence on said indication of whether or not the communication device is enabled to use said second communication path, control data for changing between said first communication path and said second communication path.

(Supplementary Note 61)

A method according to supplementary note 60 wherein said providing, in dependence on said indication of whether or not the communication device is enabled to use said second communication path, control data for changing between said first communication path and said second communication path comprises:

providing said control data for changing between said first and said second communication paths when said indication of whether or not the communication device is enabled to use said second communication path indicates that said device is enabled to use said second communication path; and not providing said control data for changing between said first and said second communication paths when said indication of whether or not the communication device is enabled to use said second communication path indicates that said device is not enabled to use said second communication path.

(Supplementary Note 62)

A computer program product comprising instructions operable to program a programmable processor to perform a method according to any of supplementary notes 58 to 61.

This application claims priority from United Kingdom Patent Application No. 1313914.2, filed on Aug. 2, 2013, the entire disclosure of which is incorporated herein by reference.

The invention claimed is:

1. A communication device for use in a cellular communication network comprising a radio access network node and for use with a wireless local area network, (WLAN) comprising a WLAN access point, the communication device comprising a controller and a transceiver wherein the controller is configured to control the transceiver to:

provide, to the radio access network node, an indication of whether the communication device is enabled to support traffic steering between the radio access network node and the WLAN access point;

receive, from the radio access network node, a WLAN measurement configuration and a steering command for the traffic steering between the radio access network node and the WLAN access point; and perform the traffic steering between the radio access network node and the WLAN access point in accordance with the steering command, wherein based on a preference for not steering any traffic to the WLAN set to the communication device, the communication device is configured to prevent the radio access network node from the traffic steering between the radio access network node and the WLAN access point by not measuring for the WLAN.

2. The communication device of claim 1, wherein based on another preference, the communication device is configured to connect another WLAN.

3. The communication device of claim 1, wherein in a case where the indication indicates the communication device is enabled to support the traffic steering, the communication device is configured to support WLANs.

4. The communication device of claim 1, wherein the controller is configured to control the transceiver to provide the indication by transmitting, to the radio access network node, at least one message including at least one information element, IE, including the indication.

5. The communication device of claim 1, the controller is configured to control the transceiver to provide the indication prior to the traffic steering.

6. The communication device of claim 1, wherein the controller is configured to control the transceiver to provide the indication as part of a procedure for attaching or registering the communication device to the cellular communication network.

7. The communication device of claim 1, wherein the controller is configured to control the transceiver to provide the indication to use a WLAN communication path as part of a radio connection establishment procedure between the communication device and the radio access network node.

8. The communication device of claim 1 wherein the controller is configured to control the transceiver to provide the indication to use a WLAN communication path by transmitting at least one message during an establishment of a connection to the cellular communications network.

9. The communication device of claim 8, wherein the at least one message comprises at least one Radio Resource Control (RRC) message.

10. The communication device claim 1, wherein the controller is configured to control the transceiver to provide the indication to use a communication path in response to a signalling associated with initiation of the traffic steering.

11. The communication device of claim 10, wherein the signalling comprises the WLAN measurement configuration.

12. The communication device of claim 11, wherein the controller is configured to control the transceiver to provide the indication by transmitting at least one message in response to the communication device receiving the WLAN measurement configuration.

13. The communication device of claim 1, wherein the controller is configured to control the transceiver to provide the indication as part of a traffic steering procedure comprising transmitting the steering command from the radio access network node.

14. A method performed by a communication device for use in a cellular communication network comprising a radio access network node and for use with a wireless local area network (WLAN) comprising a WLAN access point, the method comprising:
- providing, to the radio access network node, an indication of whether the communication device is enabled to support traffic steering between the radio access network node and a WLAN access point;
- receiving, from the radio access network node, a WLAN measurement configuration and a steering command for the traffic steering between the radio access network node and the WLAN access point;
- performing the traffic steering between the radio access network node and the WLAN access point in accordance with the steering command; and
- based on a preference for not steering any traffic to the WLAN set to the communication device, preventing the radio access network node from the traffic steering between the radio access network node and the WLAN access point by not measuring for the WLAN.

* * * * *